US009268032B2

(12) United States Patent
Yang et al.

(10) Patent No.: US 9,268,032 B2
(45) Date of Patent: Feb. 23, 2016

(54) ELECTRICAL RADIOGRAPHY IMAGING SYSTEM AND METHOD THEREOF

(71) Applicant: INDUSTRIAL TECHNOLOGY RESEARCH INSTITUTE, Hsinchu (TW)

(72) Inventors: Ming-Huan Yang, Taichung (TW); Bo-Wen Xiao, Taoyuan County (TW); Chien-Ju Lee, Taoyuan (TW); Wen-Tung Wang, Hsinchu County (TW); Wei-Ben Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/559,621

(22) Filed: Dec. 3, 2014

(65) Prior Publication Data

US 2015/0323679 A1   Nov. 12, 2015

(30) Foreign Application Priority Data

May 12, 2014  (TW) .............................. 103116737 A

(51) Int. Cl.
    *G01T 1/20*      (2006.01)
    *G01T 1/164*     (2006.01)
    *G01T 1/24*      (2006.01)

(52) U.S. Cl.
    CPC ................. *G01T 1/1641* (2013.01); *G01T 1/20* (2013.01); *G01T 1/241* (2013.01)

(58) Field of Classification Search
    CPC .............. G01T 1/20; G01T 1/24; G01T 1/124
    USPC ................................................. 250/362, 366
    See application file for complete search history.

(56) References Cited

U.S. PATENT DOCUMENTS 5,198,673 A   3/1993   Rougeot et al.
5,864,146 A   1/1999   Karellas
(Continued)

FOREIGN PATENT DOCUMENTS

TW   201002348 A   1/2010
TW   201032343 A   9/2010
(Continued)

OTHER PUBLICATIONS

S. Abbaszadeh et al., The effect of the substrate on transient photodarkening in stabilized amorphous selenium, Journal of Non-Crystalline Solids, 2012, pp. 2389-2392.
(Continued)

*Primary Examiner* — David Porta
*Assistant Examiner* — Meenakshi Sahu
(74) *Attorney, Agent, or Firm* — Locke Lord LLP; Tim Tingkang Xia, Esq.

(57) ABSTRACT

A sensing element for electromagnetic wave detection, electrical radiography imaging system applying the element and method thereof is provided. The sensing element may include a substrate, an active component on the substrate, a plurality of first electrodes on the substrate, a plurality of second electrodes on the substrate, a first blocking layer, a photo-conversion layer on the first blocking layer, and a third electrode on the photo-conversion layer. The plurality of first electrodes is coupled together. The plurality of first electrodes is interlaced with the plurality of second electrodes and is coupled together. The first blocking layer is on the active component, the plurality of first electrodes, and the plurality of second electrodes. The photo-conversion layer is for absorbing electromagnetic wave transmitted through an object being imaged by a radiography imaging system and generates electric charges collected by the plurality of first and second electrodes, and the third electrodes.

20 Claims, 22 Drawing Sheets

(56) References Cited

U.S. PATENT DOCUMENTS

| | | |
|---|---|---|
| 6,281,507 B1 | 8/2001 | Ghelmansarai |
| 6,713,062 B1 | 3/2004 | Merchant |
| 6,717,174 B2 | 4/2004 | Karellas |
| 6,856,670 B2 | 2/2005 | Hoheisel |
| 7,288,679 B2 | 10/2007 | Vanmaele et al. |
| 7,446,318 B2 | 11/2008 | Campbell |
| 7,498,342 B2 | 3/2009 | Ibrahim et al. |
| 7,567,649 B1 | 7/2009 | Safai et al. |
| 7,569,832 B2 | 8/2009 | Tredwell et al. |
| 7,629,633 B2 | 12/2009 | Chan et al. |
| 7,825,382 B2 | 11/2010 | Campbell |
| 7,834,321 B2 | 11/2010 | Yorkston et al. |
| 7,947,708 B2 | 5/2011 | Ibrahim et al. |
| 8,791,537 B2 | 7/2014 | Chan et al. |
| 2002/0134944 A1* | 9/2002 | Arakawa .......... H01L 27/14658 250/370.11 |
| 2003/0148295 A1 | 8/2003 | Wan et al. |
| 2005/0267345 A1 | 12/2005 | Korgel et al. |
| 2006/0054835 A1 | 3/2006 | Rowlands et al. |
| 2006/0151708 A1 | 7/2006 | Bani-Hashemi et al. |
| 2007/0045554 A1 | 3/2007 | Wakamatsu et al. |
| 2007/0075253 A1 | 4/2007 | Misawa et al. |
| 2007/0262266 A1 | 11/2007 | Hoheisel et al. |
| 2008/0274155 A1 | 11/2008 | Barton et al. |
| 2009/0036321 A1 | 2/2009 | Moler et al. |
| 2010/0127279 A1 | 5/2010 | Takahashi |
| 2010/0331200 A1 | 12/2010 | Gordon et al. |
| 2012/0038013 A1 | 2/2012 | Karim et al. |
| 2013/0134317 A1* | 5/2013 | Fauler .................... G01T 1/241 250/371 |

FOREIGN PATENT DOCUMENTS

| | | |
|---|---|---|
| TW | 201201392 A | 1/2012 |
| TW | 201333019 A | 8/2013 |
| TW | 201334189 A | 8/2013 |
| WO | 2010047494 A3 | 4/2010 |
| WO | 2010121386 A1 | 10/2010 |
| WO | 2013082721 A1 | 6/2013 |

OTHER PUBLICATIONS

Shiva Abbaszadeh et al., Characterization of Low Dark-Current Lateral Amorphous-Selenium Metal-Semiconductor-Metal Photodetectors, IEEE Sensors Journal, May 2013, pp. 1452-1458; vol. 13, No. 5.
Shiva Abbaszadeh et al., Investigation of Hole-Blocking Contacts for High-Conversion-Gain Amorphous Selenium Detectors for X-Ray Imaging, IEEE Transactions on Electron Devices, Sep. 2012, pp. 2403-2409; vol. 59, No. 9.
Shiva Abbaszadeh et al., Low Dark-Current Lateral Amorphous-Selenium Metal-Semiconductor-Metal Photodetector, IEEE Electron Device Letters, Sep. 2011, pp. 1263-1265; vol. 32, No. 9.
A. Gektin et al., Inorganic-organic rubbery scintillators, Nuclear Instruments and Methods in Physics Research, 2002, pp. 191-195; Section A 486.
Safa Kasap et al., Amorphous and Polycrystalline Photoconductors for Direct Conversion Flat Panel X-Ray Image Sensors, Sensors Journal, 2011, pp. 5112-5157; ISSN 1424-8220.
Rasoul Keshavarzi et al., Performance of a prototype 32x32 pixel indirect X-ray imager based on a lateral Selenium passive pixel sensor, Medical Imaging 2012: Physics of Medical Imaging, 2012, pp. 83135O-1-83135O-8; Proc. of SPIE vol. 8313.
Guoying Qu et al., A novel dual screen-dual film combination for mammography, SPIE Conference on Physics of Medical Imaging, San Diego, California, Feb. 1998, pp. 572-582; SPIE vol. 3336.
W. Que et al., X-ray imaging using amorphous selenium: Inherent spatial resolution, Medical Physics, Apr. 1995, pp. 365-374, vol. 22, No. 4.
A. Reznik et al., Applications of avalanche multiplication in amorphous selenium to flat panel detectors for medical applications, J Mater Sci: Mater Electron, 2009, pp. 63-67, vol. 20.
Afrin Sultana et al., Digital X-Ray Imaging Using Avalanche a-Se Photoconductor, IEEE Sensors Journal, Feb. 2010, pp. 347-352; vol. 10, No. 2.
Afrin Sultana et al., Design and feasibility of active matrix flat panel detector using avalanche amorphous selenium for protein crystallography, Med. Phys., Oct. 2008, pp. 4324-4332; vol. 35, No. 10.
Kai Wang et al., Integration of an Amorphous Silicon Passive Pixel Sensor Array with a Lateral Amorphous Selenium Detector for Large Area Indirect Conversion X-ray Imaging Applications, Medical Imaging 2011: Physics of Medical Imaging, 2011, pp. 79610V-1-79610V-4, Proc. of SPIE vol. 7961.
Kai Wang et al., Lateral metal-semiconductor-metal photodetectors based on amorphous selenium; Applied Physics Letters, 2009, pp. 013505-013505-3, vol. 95.
Kai Wang et al., Design and modeling of a lateral a-Se MSM photoconductor as an indirect conversion X-ray imager, Hard X-Ray, Gamma-Ray, and Neutron Detector Physics XI, 2009, pp. 74491W-1-74491W-8, Proc. of SPIE vol. 7449.
M. M. Wronski et al., A solid-state amorphous selenium avalanche technology for low photon flux imaging applications, Medical Physics Letter, Sep. 2010, pp. 4982-4985, vol. 37, No. 9.
"Office Action" issued by the Taiwan Intellectual Property Office on Mar. 24, 2014.

* cited by examiner

ELECTRICAL RADIOGRAPHY IMAGING SYSTEM AND METHOD THEREOF

CROSS-REFERENCE TO RELATED APPLICATIONS

This non-provisional application claims priority under 35 U.S.C. §119(a) on Patent Application No(s). 103116737 filed in Taiwan, R.O.C. on May 12, 2014, the entire contents of which are hereby incorporated by reference.

TECHNICAL FIELD

The disclosure is related to an electrical radiography imaging system and a method thereof.

BACKGROUND

Medical diagnosis utilizes silver halide films as radiograms for absorbing x-ray radiation transmitted through a body being imaged by the radiography imaging system. According to the recent development in the field of radiography imaging technology, the silver halide films are replaced by electrical radiograms in some applications.

The electrical radiograms uses layers of radiation sensitive materials to directly capture radiographic images as imagewise modulated patterns of electric charges. The radiation sensitive materials are divided into a two-dimension matrix (pixelized area). The radiation sensitive materials in each pixelized area generate electric charges in response to the x-ray radiation. The higher the intensity of the x-ray is, the more electric charges are generated. By collecting the electric charges from each of the pixelized area, electrical radiography imaging system could produce an electrical radiograph on a display.

SUMMARY

According to one or more embodiments, the disclosure provides an electrical radiography imaging system. In one embodiment, the electrical radiography imaging system includes a sensing element including a plurality of pixels arranged in an array. Each of the pixels includes a substrate, an active component, a first electrode, a second electrode, a photo-conversion layer, and a third electrode. The active component is on the substrate. The first electrode is on the substrate, and the second electrode is on the substrate. The first electrode has a plurality of first portions, and the second electrode has a plurality of first portions. The first portions of the first electrode are interlaced with the first portions of the second electrode. The second electrode is electrically coupled with the active component. The photo-conversion layer is on the second electrode. The third electrode is on the photo-conversion layer.

According to one or more embodiments, the disclosure provides a radiography imaging method. In one embodiment, the radiography imaging method includes the following steps. A plurality of active components of a sensing element is driven scanningly. The sensing element includes a plurality of pixels each including one of the active components, a photo-conversion layer, a first electrode, a second electrode, and a third electrode. The photo-conversion layer is disposed among the first electrode, the second electrode, and the third electrode. The first electrode and the third electrode are respectively provided with a plurality of high voltage signals to form a horizontal electric field between the first electrode and the second electrode, and to form a vertical electric field between the third electrode and the second electrode. Electric charges are received from the driven active component.

According to one or more embodiments, the disclosure provides a radiography imaging method. In one embodiment, the radiography imaging method includes the following steps. A plurality of active components of a sensing element is driven scanningly. The sensing element includes a plurality of pixels, and each of the pixels includes one of the active components, a photo-conversion layer, a first electrode set, a plurality of first ribs, and a second electrode set. A plurality of first portions of the first electrode set is on the first ribs, the photo-conversion layer is between the first electrode set and the second electrode set, and the second electrode set has a plurality of second ribs corresponding to the first portions of the first electrode set. The first electrode set and the second electrode set are respectively provided with a high voltage signal to form a horizontal electric field and a vertical electric field between the first electrode set and the second electrode set. Electric charges are received from the driven active component.

BRIEF DESCRIPTION OF THE DRAWINGS

The present disclosure will become more fully understood from the detailed description given herein below for illustration, and thus does not limit the present disclosure, wherein.

DETAILED DESCRIPTION

Figure 1A:
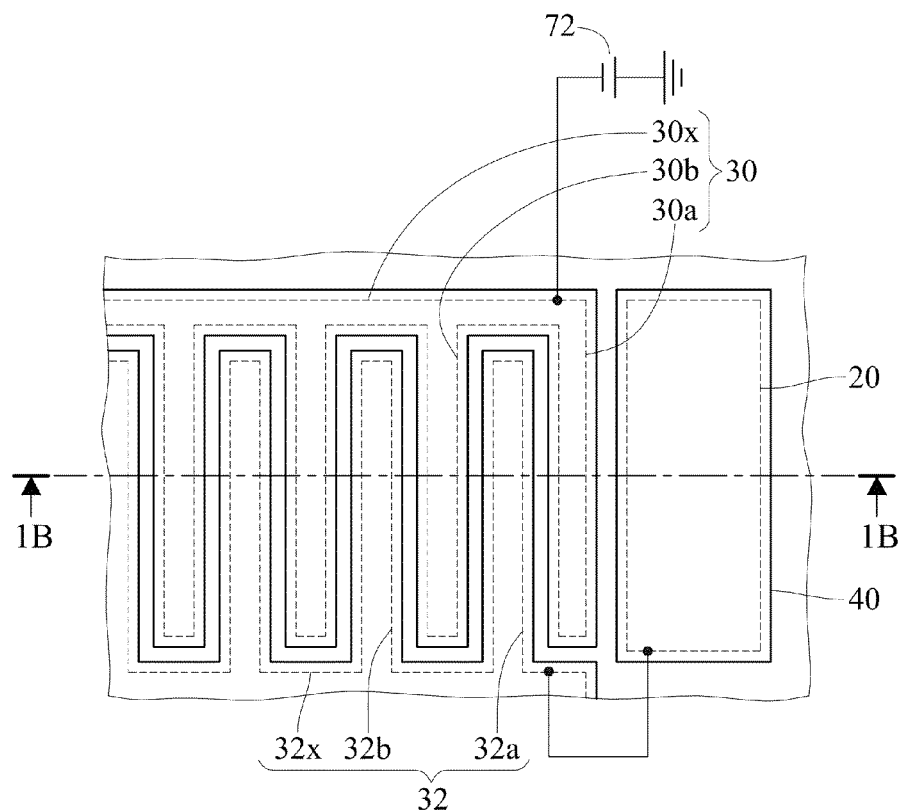
FIG. 1A illustrates a portion of the top view of a sensing element for electromagnetic wave detection in an electrical radiography imaging system according to the first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
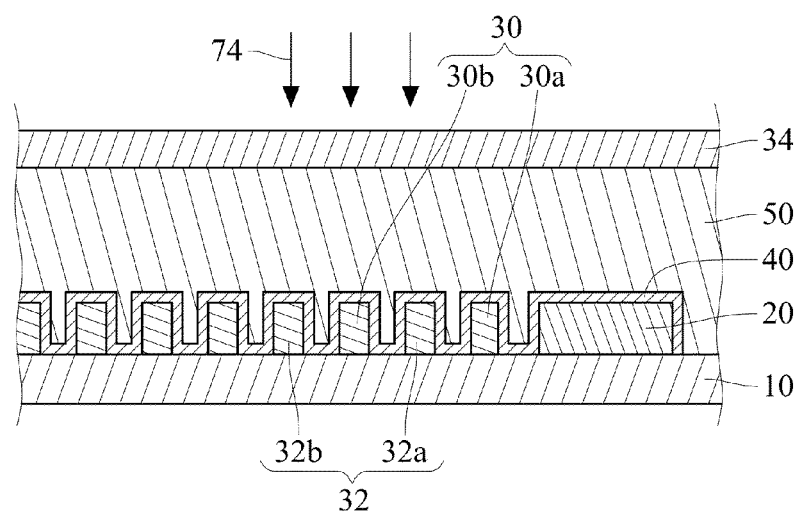
FIG. 1B illustrates the cross-sectional view at the position 1B-1B of the FIG. 1A.
Figure 1C:
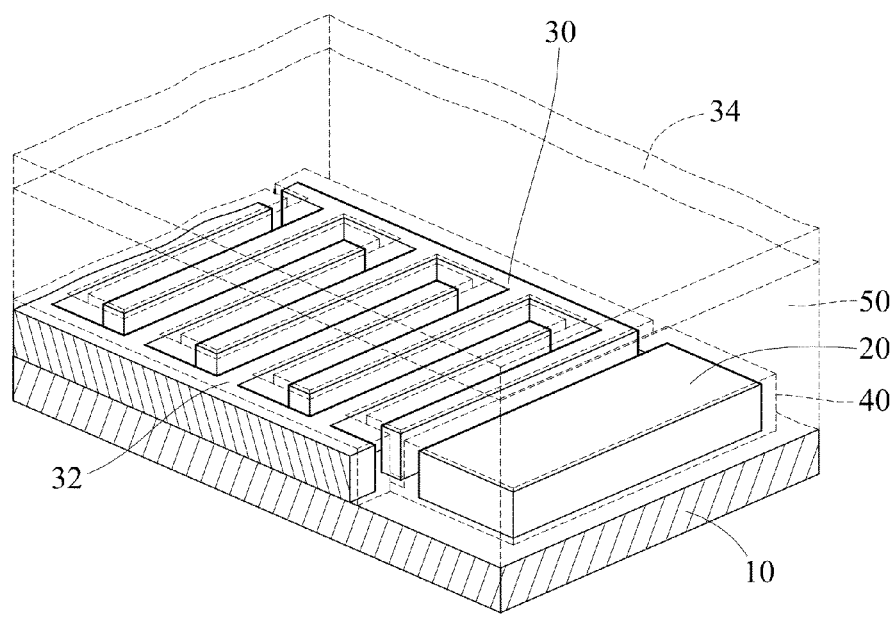
FIG. 1C illustrates a perspective view of the sensing element in the FIG. 1A.

At the outset, please refer to FIGS. 1A to 1C. FIG. 1A illustrates a portion of the top view of a sensing element for electromagnetic wave detection in an electrical radiography imaging system according to the first embodiment. FIG. 1B illustrates the cross-sectional view at the position 1B-1B of the FIG. 1A. FIG. 1C illustrates a perspective view of the sensing element in the FIG. 1A.

A sensing element may include a plurality of pixels arranged in a two dimension array. Please refer to FIG. 1A which is a portion of top view of single pixel of the sensing element. Each of the pixels of the sensing element may include a substrate 10, an active component 20, a first electrode set (e.g. a first electrode 30 and a second electrode 32), a second electrode set (e.g. a third electrode 34), a first blocking layer 40, and a photo-conversion layer 50.

The first electrode 30 may include a plurality of first portions (or called as fork portions) 30a, 30b and a second portion (or called as connection portion) 30x. The first portions 30a, 30b of the first electrode 30 in this embodiment may be in strip shape and be substantially parallel to each other. The second portion 30x of the first electrode 30 may be substantially perpendicular to and may be electrically connected with the first portions 30a, 30b of the first electrode 30.

The second electrode 32 may include a plurality of first portions 32a, 32b and a second portion 32x. The first portions 32a, 32b of the second electrode 32 in this embodiment are in strip shape and are substantially parallel to each other. The second portion 32x of the second electrode 32 may be substantially perpendicular to and may be electrically connected with the first portions 32a, 32b of the second electrode 32. The first portions 30a, 30b of the first electrode 30 are interlaced but no in contact with the first portions 32a, 32b of the second electrode 32. For instance, the first electrode 30 and the second electrode 32 are interdigitated electrodes.

The active component 20 may be on the substrate 10. The first blocking layer 40 may be on the active component 20, the first electrode 30, and the second electrode 32. The photo-conversion layer 50 may be on the first blocking layer 40. The third electrode 34 may be on the photo-conversion layer 50.

The active component 20 may be, but not limited to, a silicon-based semiconductor element or metal oxide semiconductor element, for example a thin film transistor (TFT). The photo-conversion layer may transform electromagnetic wave into electric charges. The electromagnetic wave may be, but not limited to, X-ray, ultraviolet (UV), or visible light. The embodiment in this disclosure utilizing X-ray and using the same element number 74 is for illustration purpose only and is not to restrict the application of the embodiments in the disclosed to x-ray only. The user may select a proper material for the photo-conversion to transfer a specific electromagnetic wave into electric charges. The electromagnetic wave incident the photo-conversion may be the electromagnetic wave passing an object to be imaged by a radiography imaging system.

The first electrodes 30 may be electrically connected with a power source 72. The second electrode 32 may be electrically connected with the active component 20. The active component 20 may include two TFTs and a capacitor 70 (referred to FIG. 5). Accordingly, the second electrode 32 may be electrically connected with the capacitor 70. The potential of the third electrode 34 may be equal to that of either the first electrodes 30 or the second electrodes 32. In other words, the third electrodes 34 may be directly or indirectly connected with either the first electrodes 30 or the second electrodes 32. Accordingly, when the photo-conversion layer 50 absorbs the incident x-ray 74, the electrons and electron holes generated by the photo-conversion layer 50 may be attracted by the first electrode 30, the second electrode 32, and/or the third electrode 34. A radiography imaging system may control the active component 20 to collect and convert the electrons into electric charges which represent the pixel. The radiography imaging system may display the intensity of the x-ray 74 incident to the pixel based on the electric charge collected from the pixel. The radiography imaging system may collect the electric charges from pixels arranged in a two dimensional array and display an electrical radiogram.

The substrate 10 may be made of, but not limited to, plastic, glass, ceramic or combination thereof. The first portion 30a, 30b of the first electrode 30 and the first portion 32a, 32b of the second electrode 32 may be arranged in parallel to each other as shown in the first embodiment. For example, the first portion 30a, 30b of first electrode 30 and the first portion 32a, 32b of second electrode 32 are in the shape of a comb or a spiral. The first electrode 30 and the second electrode 32 may be made of, but not limited to, any conductive material, for example, metal, alloy, conductive polymer, or oxide.

The first blocking layer 40 may be prevented from leakage current among the first, second, and the third electrodes 30, 32, 34. The first blocking layer 40 may be made of, but not limited to, oxide, organic materials, or polymer. The photo-conversion layer 50 may absorb x-ray radiation transmitted through an object being imaged by the radiography imaging system. The photo-conversion layer 50 may be made of, but not limited to, amorphous selenium (a-Se), amorphous silicon (a-Si), lead oxide (PbO), cadmium selenide (CdSe), cadmium telluride (CdTe), lead diiodide (PbI2), CdZnTe, and organic semiconductor material, the photo-conversion layer may generate electric charges by absorbing the excited light.

The third electrode 34 may be, but not limited to, a transparent electrode which is transparent to most of x-ray 74. The third electrode 34 may be made of, but not limited to, any conductive material, for example, metal, alloy, conductive polymer, or oxide.

Figure 2:
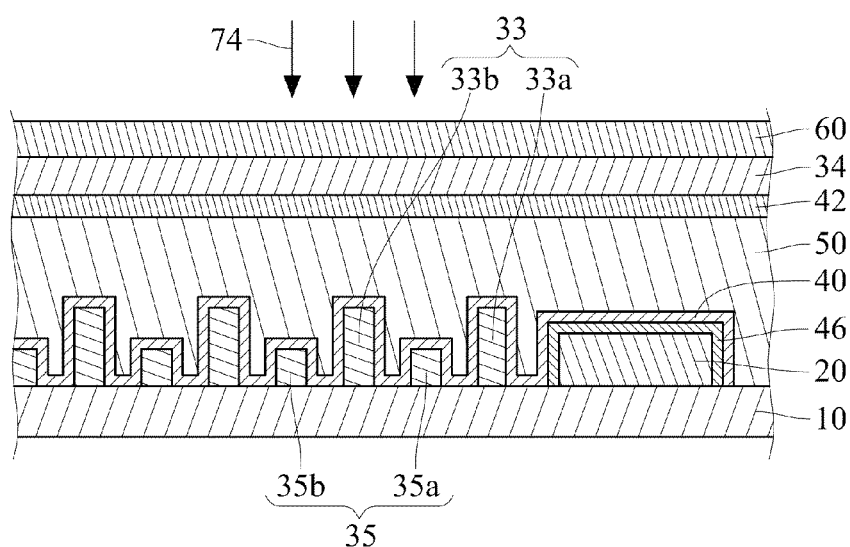
FIG. 2 illustrates the cross-sectional view of a sensing element for electromagnetic wave detection in an electrical radiography imaging system according to the second embodiment.

Please refer to FIG. 2 which illustrates the cross-sectional view of a sensing element for electromagnetic wave detection in an electrical radiography imaging system according to the second embodiment. According to FIG. 2, the sensing element may include a substrate 10, an active component 20, an insulating layer 46, a first electrode 33, a second electrode 35, a third electrode 34, a firs blocking layer 40, a second blocking layer 42, a photoexcitation layer 60 (or called as a photo-luminescence layer), and a photo-conversion layer 50. The first electrode 33 may include a plurality of first portions 33a, 33b. The second electrode 35 may include a plurality of first portions 35a, 35b.

As shown in FIG. 2, the height of each of the plurality of the first portions 35a, 35b of the second electrode 35 may be, but not limited to, higher than the height of each of the plurality of the first portions 33a, 33b of the first electrode 33. Alternatively, the height of each of the plurality of the first portion 35a, 35b of second electrode 35 may be lower than the height of each of the plurality of the first portions 33a, 33b of the first electrode 33. In the second embodiment, the potential of the second electrode 35 may be substantially equal to the potential of the third electrode 34 to prevent leakage current and to raise signal noise ratio (SNR). In addition, the potential of the first electrode 33 may be between the potential of the second electrode 35 and the potential of the third electrode 34. For example, the potential of the first electrode 33 is, but not limited to, −5 V (volt), the potential of the second electrode 35 is, but not limited to, 0 V, and the potential of the third electrode is, but not limited to, −20 V. Or, the potential of the first electrode 33 may be substantially equal to the potential of the third electrode 34. For example, the potential of the first and the third electrodes 33, 34 is, but not limited to, −20 V and the potential of the second electrode 35 is, but not limited to, 0 V (ground).

The photoexcitation layer 60 may emit an excited light when the photoexcitation layer 60 is excited by electromagnetic waves (or by photons). The material of photoexcitation layer 60 may be fluorescent material or luminescent material; for instance, phosphorous materials or fluorescent materials. The following embodiment takes x-ray 74 as an example of the electromagnetic waves. However, the x-ray 74 is not to restrict the application scope of the disclosure. The photoexcitation layer 60 may be excited to emit an excited light when the photoexcitation layer 60 absorbs or is excited by the x-ray 74. The excited light may be, but not limited to, ultraviolet or visible light. The excited light may pass through the third electrode 34 and enter the photo-conversion layer 50. The photo-conversion layer may convert the excited light into electric charges. Therefore, the third electrode 34 may be a transparent electrode through which most of the excited light (for instance, visible light) passes through. In addition, the overall photo-electric conversion efficiency of the photoconductive element may become much better because the photo-conversion layer 50 could generate more electric charges by absorbing the visible light than the x-ray. Consequently, the thickness of the photo-conversion layer 50 may be reduced due to better efficiency and the flexibility of the photoconductive element may become better.

The insulating layer 46 may prevent the active component 20 from being electrically connected with any of the first and second electrodes 33, 35. The material of the insulating layer 46 may be, but not limited to, ceramic material, organic material or mixture of the ceramic and organic materials. The ceramic material may be, for example, silicon oxide, silicon nitride, Hafnium oxide, or titanium oxide. The organic material may be, for instance, epoxy resin, polyacrylate, or polyurethane.

The first blocking layer 40 and the second blocking layer 42 may prevent leakage current among the first, second, and third electrodes 33, 35, 34. The first and the second blocking layers 40, 42 may be, but not limited to, oxide, organic materials, or polymer.

Figure 3:
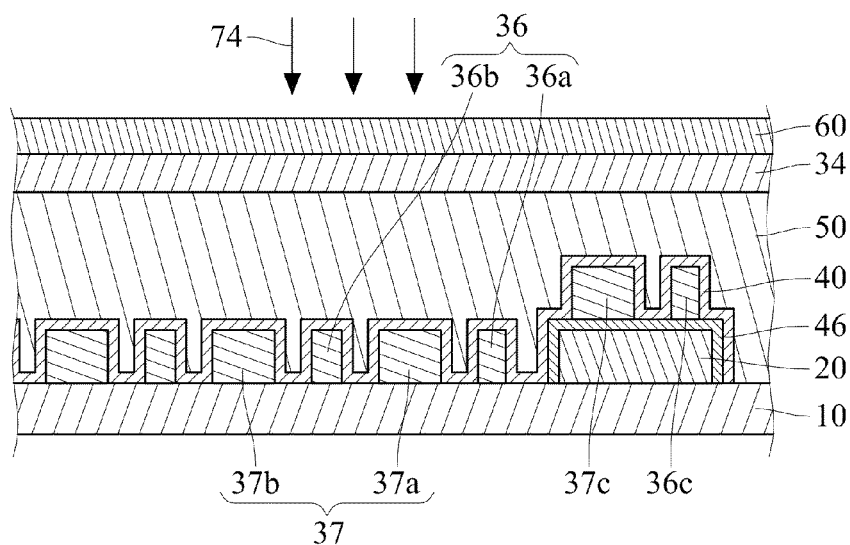
FIG. 3 illustrates the cross-sectional view of a sensing element for electromagnetic wave detection in an electrical radiography imaging system according to the third embodiment.

Please refer FIG. 3 which illustrates the cross-sectional view of a sensing element for electromagnetic wave detection in an electrical radiography imaging system according to the third embodiment. The sensing element may include a substrate 10, an active component 20, an insulating layer 46, a first electrode 36, a second electrode 37, a third electrode 34, a first blocking layer 40, a photoexcitation layer 60, and a photo-conversion layer 50. The first electrode 36 may include a plurality of first portions 36a, 36b of the first electrode 36. The second electrode 37 may include a plurality of first portions 37a, 37b of the second electrode 37.

As shown in FIG. 3, the width of each of the plurality of first portions 36a, 36b of the first electrode 36 may be substantially different from that of each of the plurality of first portions 37a, 37b of the second electrode 37 (the horizontal direction of the FIG. 3). The width of each of the plurality of first portions 36a, 36b of the first electrode 36 may be, but not limited to, substantially wider than that of each of the plurality of first portions 37a, 37b of the second electrodes 37. The different widths of the plurality of first portions 36a, 36b, 37a, 37b of the first and second electrodes 36, 37 may increase the electric field along the vertical direction shown in FIG. 3, the electric charge-collecting efficiency, and signal-and-noise ratio. Some of the plurality of first portions 36a, 36b of the first electrode 36 and some of the plurality of first portions 37a, 37b of the second electrode 37 may be disposed above the active component 20 to increase the electric charge-collecting efficiency of the plurality of first portions 36a, 36b, 37a, 37b of the first and second electrodes 36, 37, and the third electrode 34.

The vertical electric field and the horizontal electric field mentioned above are illustrated based on the view of the figures which is not to restrict the scope of the disclosure. The vertical and horizontal electric fields may be any two electric fields orthogonal to each other.

According to the third embodiment, the photoexcitation layer 60 may emit visible light after excited by x-ray 74. The visible light may pass through the third electrode 34 and enter the photo-conversion layer 50. The photo-conversion layer may convert the visible light into electric charges.

Figure 4:
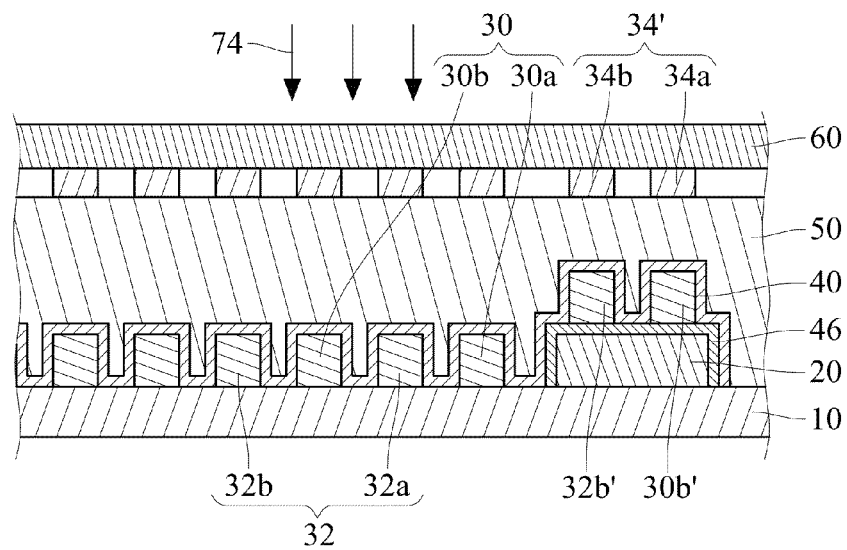
FIG. 4 illustrates the cross-sectional view of a sensing element for electromagnetic wave detection in an electrical radiography imaging system according to the fourth embodiment.

Please refer FIG. 4 which illustrates the cross-sectional view of a sensing element for electromagnetic wave detection in an electrical radiography imaging system according to the fourth embodiment. The sensing element may include a substrate 10, an active component 20, an insulating layer 46, a first electrode 30, a second electrode 32, a third electrode 34', a first blocking layer 40, a photoexcitation layer 60, and a photo-conversion layer 50. The first electrode 30 may include a plurality of first portions 30a, 30b of the first electrode 30. The second electrode 32 may include a plurality of first portions 32a, 32b of the second electrode 32.

The third electrode 34' may include a plurality of sub-electrodes 34a, 34b. Each of the first portions 30a, 30b of the first electrode 30 may correspond to one of the sub-electrodes 34a, 34b. Each of the first portions 32a, 32b of the second electrode 32 may correspond to one of the sub-electrodes 34a, 34b. As shown in FIG. 4, some of the plurality of the first portions 30a, 30b, 32a, 32b of the first and second electrodes 30, 32 may be disposed above the active component 20.

The thickness of the photo-conversion layer 50 may be, but not limited to, 1 to 2 micrometers (um). The thickness of each of the plurality of the first portions 30a, 30b, 32a, 32b of the first and second electrodes 30, 32 may be, but not limited to, 500 to 1000 nanometers (nm). The overall thickness of the sensing element may be, but not limited to, 100 um.

Figure 5:
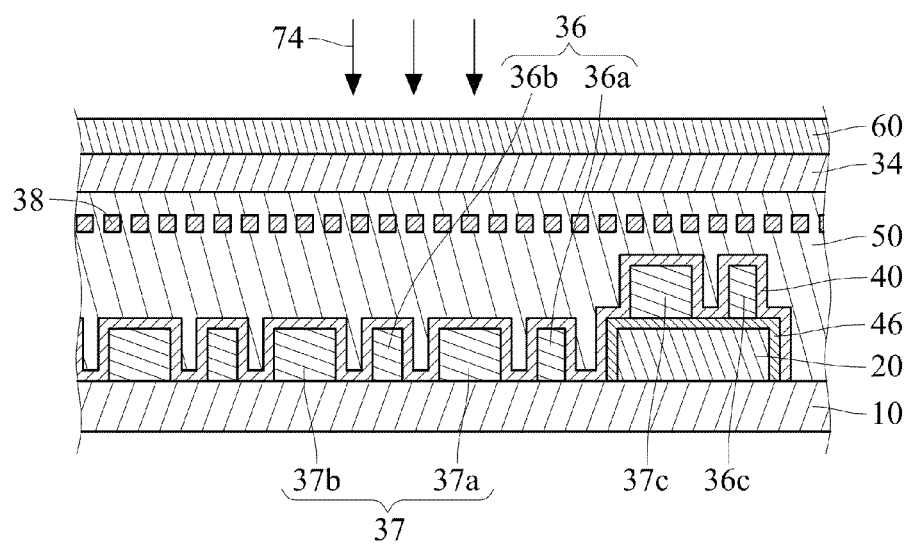
FIG. 5 illustrates the cross-sectional view of a sensing element for electromagnetic wave detection in an electrical radiography imaging system according to the fifth embodiment.

Please refer FIG. 5 which illustrates the cross-sectional view of a sensing element for electromagnetic wave detection in an electrical radiography imaging system according to the fifth embodiment. The sensing element of the fifth embodiment may be almost similar to the sensing element of third embodiment. The sensing element of the fifth embodiment may further include a plurality of fourth electrodes 38. The plurality of fourth electrodes 38 (or referred as embedded electrodes) may be individually embedded within the photo-conversion layer 50 and may not be electrically connected with each other. Any of the plurality of fourth electrodes 38 may not be electrically connected with any of a plurality of first and second electrodes 36, 37, and the third electrode 34. The plurality of fourth electrodes 38 may be prevented from leakage current among the plurality of first and second electrodes 36, 37, and the third electrode 34.

Please refer to FIGS. 6A, 6B, 6C, 6D, and 6E. FIGS. 6A, 6B, 6C, 6D, and 6E illustrate contours of electric field received from the sensing elements according to the first, second, third, fourth, and fifth embodiments while the first, the second, and the third electrodes of the sensing elements may be supplied with electrical power with different voltage level.

Figure 8:
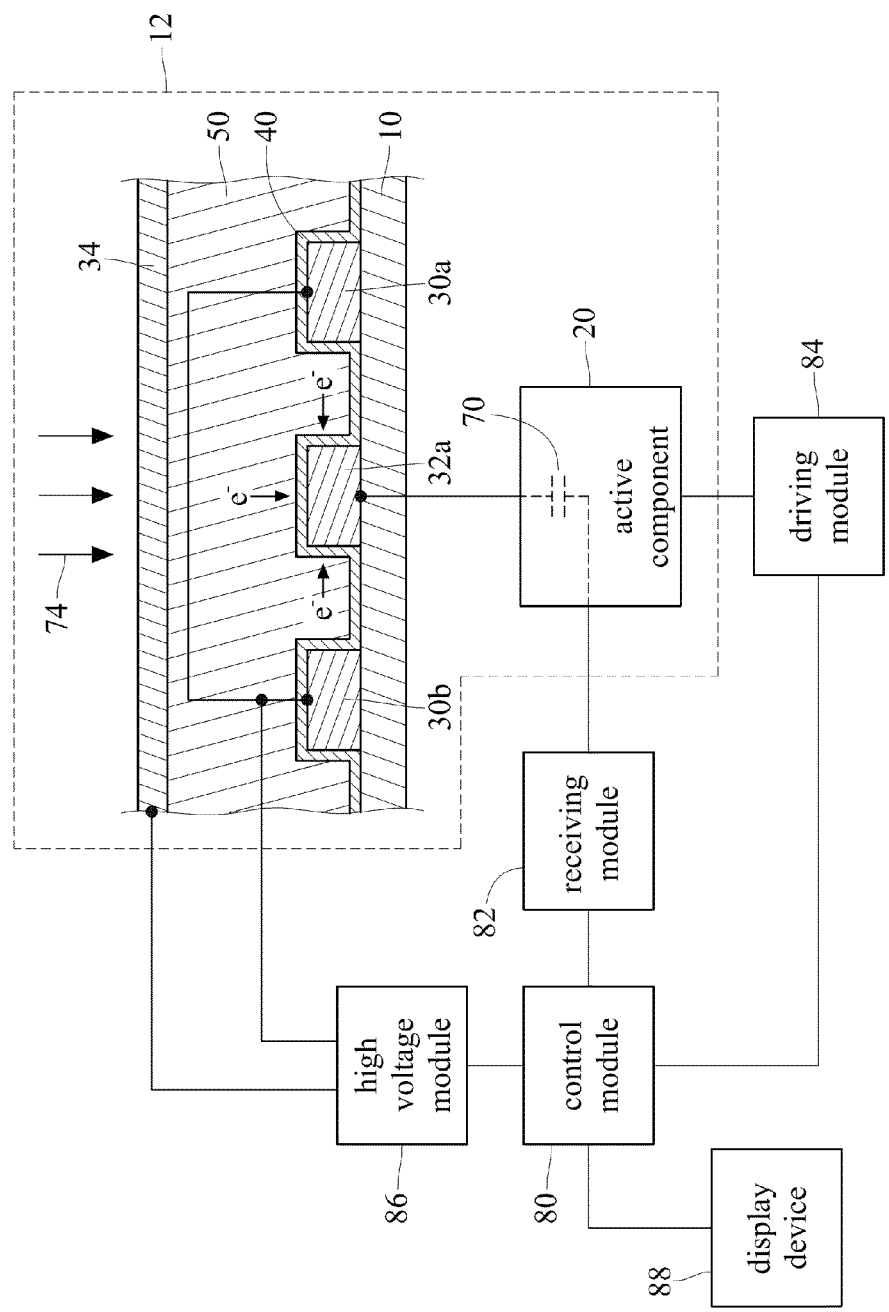
FIG. 8 illustrates a function block diagram of an electrical radiography imaging system according to one embodiment.

The black box at the left-bottom corner of the FIG. 6A-6E may correspond to the outline of the second electrode 32 which is grounded. The block box at the right-bottom of the FIG. 6A-6E may correspond to the outline of the first electrode 30 which is supplied with −5 V by the high voltage module 86 (as shown in FIG. 8). The black rectangular box on the top may correspond to the third electrode 34 which is supplied with −20 V by the high voltage module 86. The small black boxes in the middle of the FIG. 5E is the fourth electrodes 38 which is not electrically connected with the first, second, third electrodes 30, 32, 34. In other words, the fourth electrodes 38 are floating.

The dimensions of the first, second, and third electrodes 30, 32, 34 are described as below.

| FIG. | | 6A | 6B | 6C | 6D | 6E |
|---|---|---|---|---|---|---|
| Third Electrode | Width | 15 um | 15 um | 17 um | 5 um | 17 um |
| | Height | 5 um | 5 um | 5 um | 5 um | 5 um |
| First Electrode | Width | 5 um | 5 um | 5 um | 5 um | 5 um |
| | Height | 5 um | 7 um | 5 um | 5 um | 5 um |
| Second Electrode | Width | 5 um | 5 um | 7 um | 5 um | 7 um |
| | Height | 5 um | 5 um | 5 um | 5 um | 5 um |
| Space between 1$^{st}$ and 2$^{nd}$ Electrodes | | 5 um | 5 um | 5 um | 5 um | 5 um |
| Fourth Electrode | Width | — | — | — | — | 1 um |
| | Height | — | — | — | — | 1 um |
| | Space | — | — | — | — | 1 um |
| | Space from 3$^{rd}$ Electrode | — | — | — | — | 2 um |

Figure 6A:
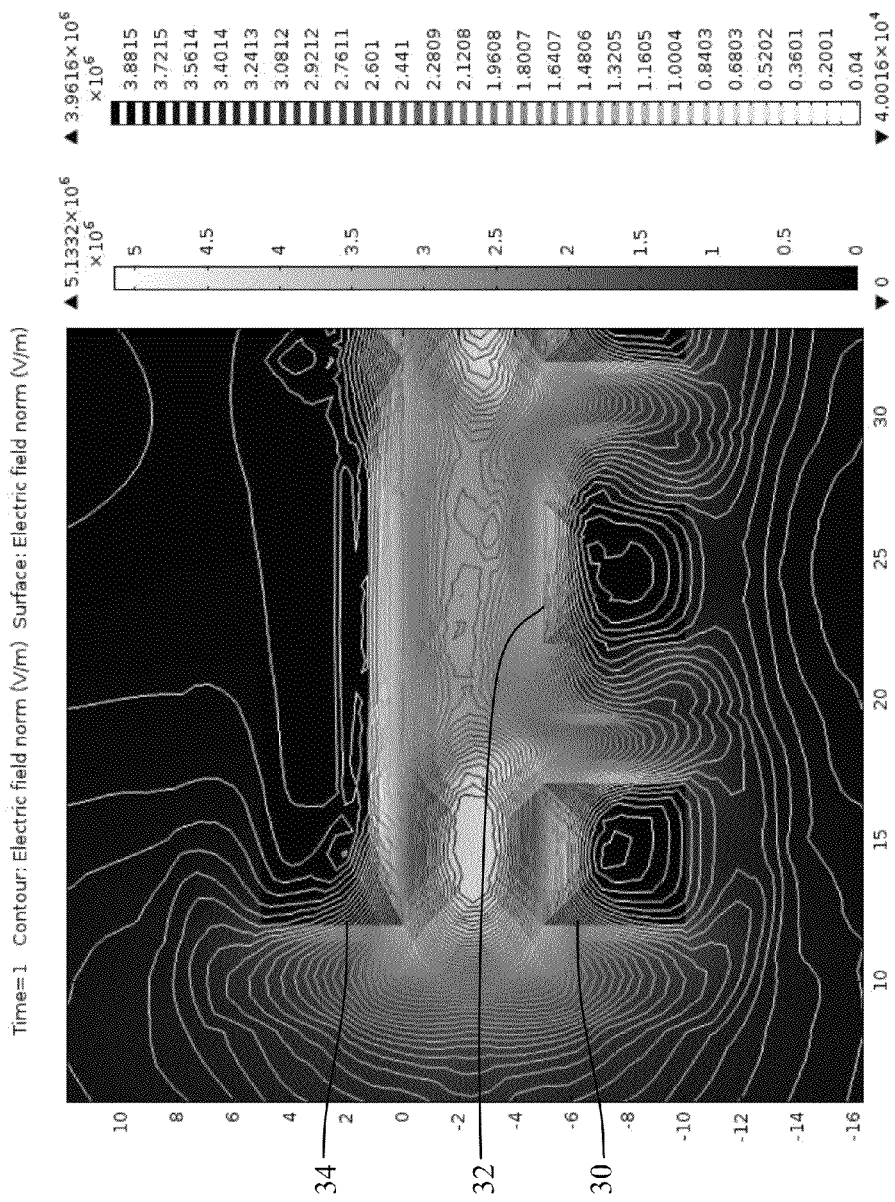
FIGS. 6A, 6B, 6C, 6D, and 6E illustrate contours of electric field received from the sensing elements according to the first, second, third, fourth, and fifth embodiments while the first and the third electrodes of the sensing elements are supplied with electrical power with different voltage level.

As shown from the above table and FIG. 6A, the dimensions of the first and second electrode 30, 32 may be the same. This is the first embodiment illustrated in FIG. 1B. As shown in FIG. 6A, the area between the second and third electrodes 32, 34 may be whiter than other area. It means the vertical electric field between the second electrode 32 and the third electrode 34 has more electric charges.

Figure 6B:
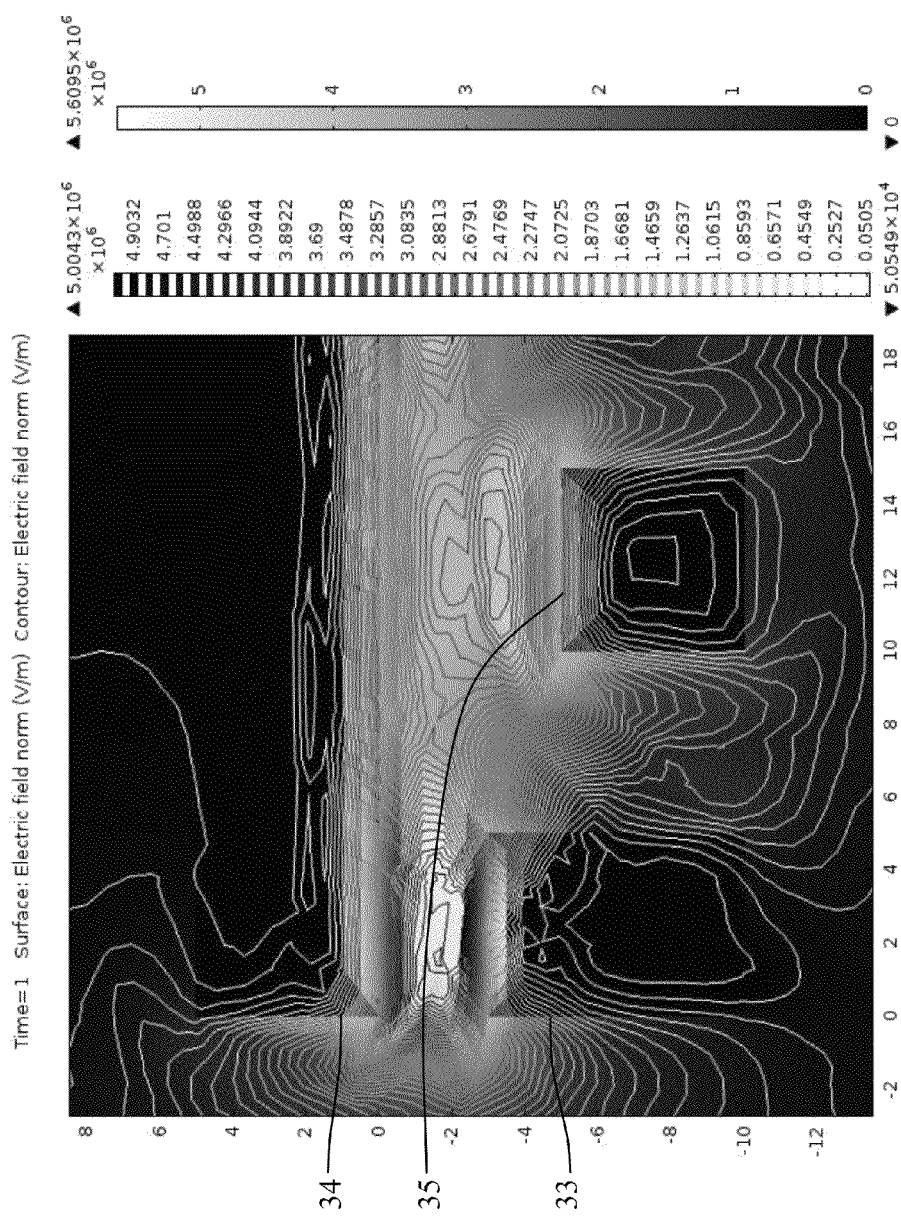
Figure 6C:
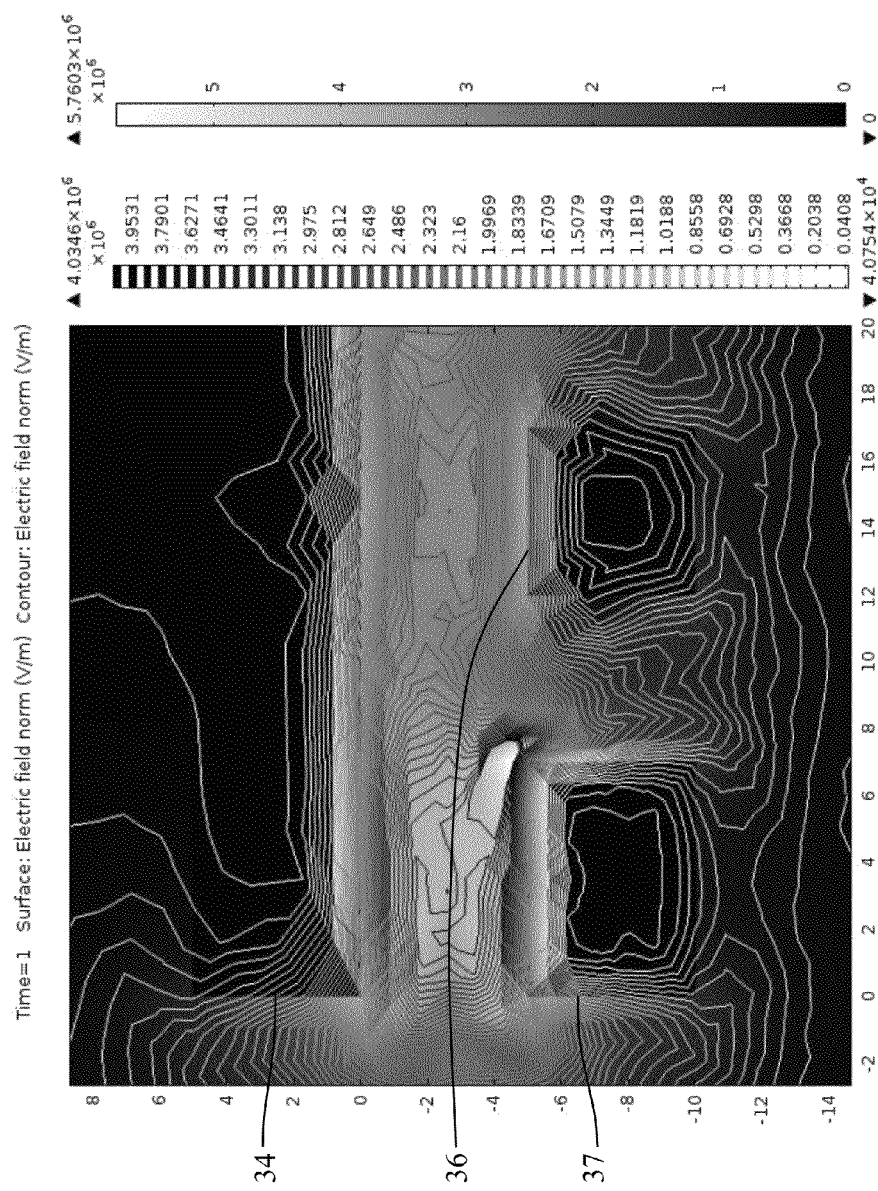
Figure 6D:
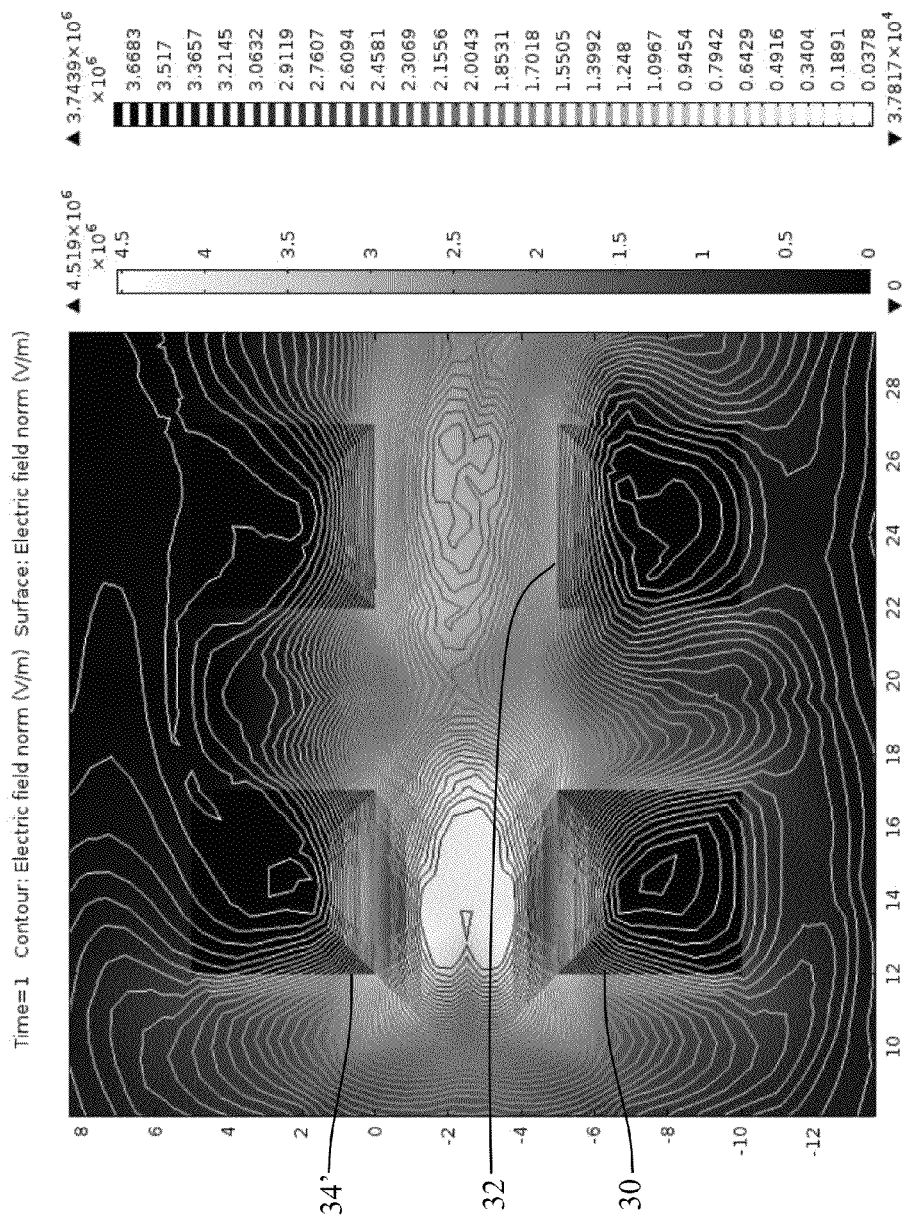
Figure 6E:
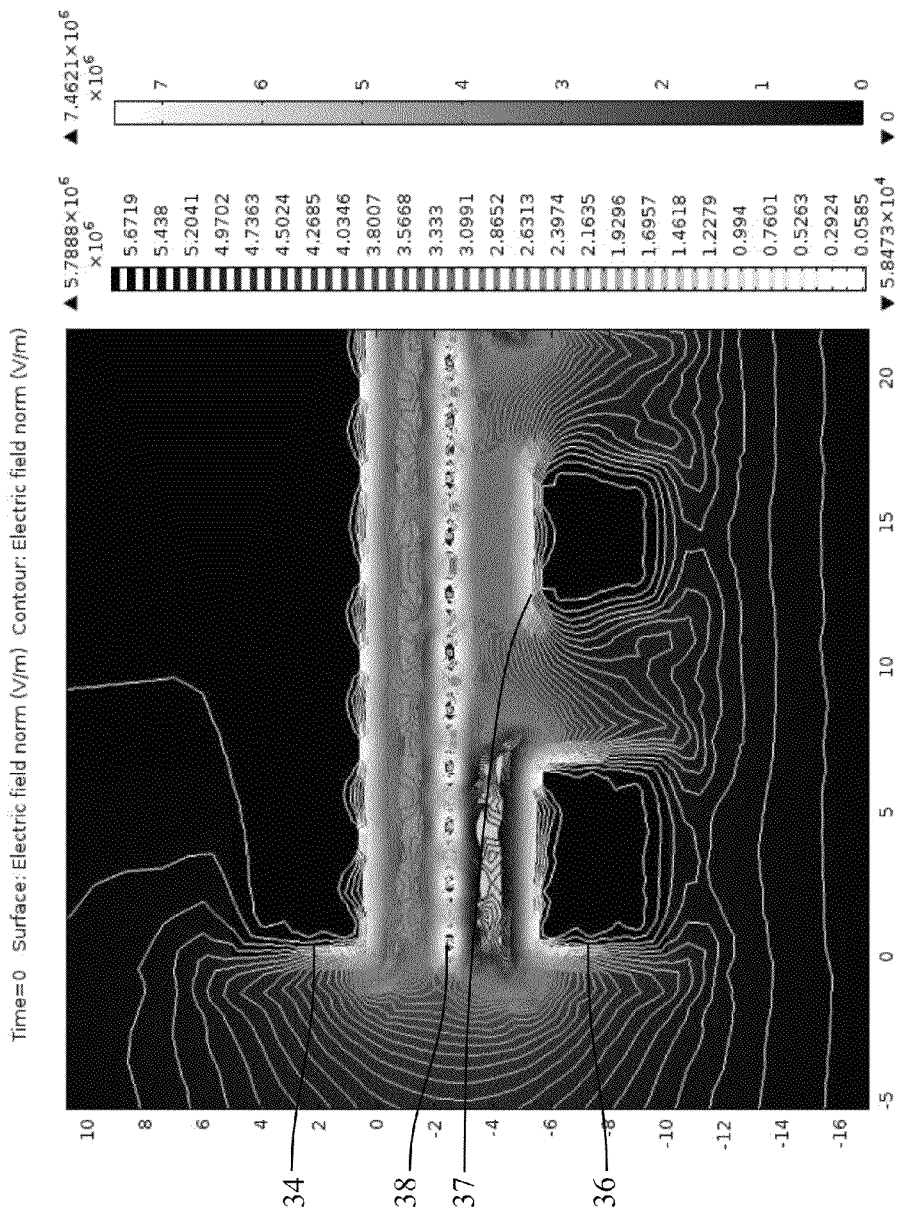

As shown in FIG. 6B, the thickness of the first electrode 30 may be thicker than that of the second electrode 32. This is the second embodiment in FIG. 2. As shown in FIG. 6C, the width of the second electrode 32 may be wider than that of the first electrode 30. This may correspond to the third embodiment in FIG. 3. As shown in FIG. 6D, the widths, heights of the first, second, and third electrodes 30, 32, 34 may be 5 um and the space between the first and the second electrodes 30, 32 may be 5 um as well. This may correspond to the fourth embodiment in FIG. 4. As shown in FIG. 6E, the embodiment of FIG. 6E may be the same as FIG. 6C except the embodiment of FIG. 6E may include the fourth electrode 38. This embodiment may correspond to the fifth embodiment of FIG. 5.

As shown in the contours of electric field received form the sensing elements of the above table, it is clear where the electric charges may be distributed for each of the embodiments. The electric charges may be even well-distributed in the photo-conversion layer 50. Additionally, based on the contours of the electric field, the user may adjust the collection time of electric charges for both vertical electric field and horizontal field. This will be discussed in detail later.

Next, please refer to FIGS. 7A, 7B, 7C, 7D, and 7E. FIGS. 7A-7E illustrate contours of electric field received from the sensing elements according to the first, second, third, fourth, and fifth embodiments while the first and the third electrodes of the sensing elements may be supplied with electrical power with the same voltage level.

The widths, heights of the first, second, and third electrodes 30, 32, 34 as well as the space between the first and the second electrode 30, 32 may be the same as that in the above table. The differences may be that the first and third electrode 30, 34 are supplied with −20 V, and the second electrode 32 is grounded (0V).

Figure 7A:
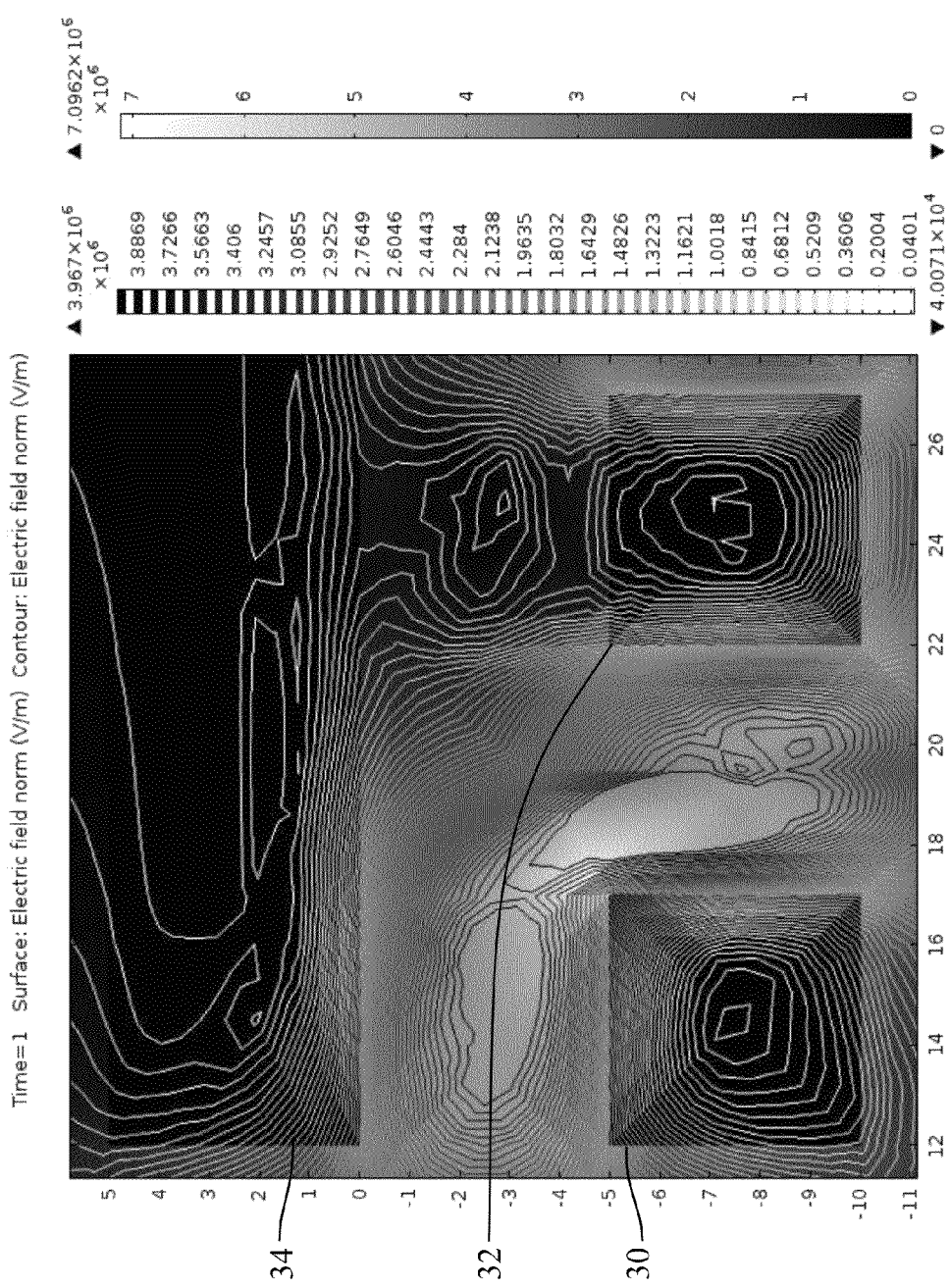
FIGS. 7A, 7B, 7C, 7D, and 7E illustrate contours of electric field received from the sensing elements according to the first, second, third, fourth, and fifth embodiments while the first and the third electrodes of the sensing elements are supplied with electrical power with the same voltage level.
Figure 7B:
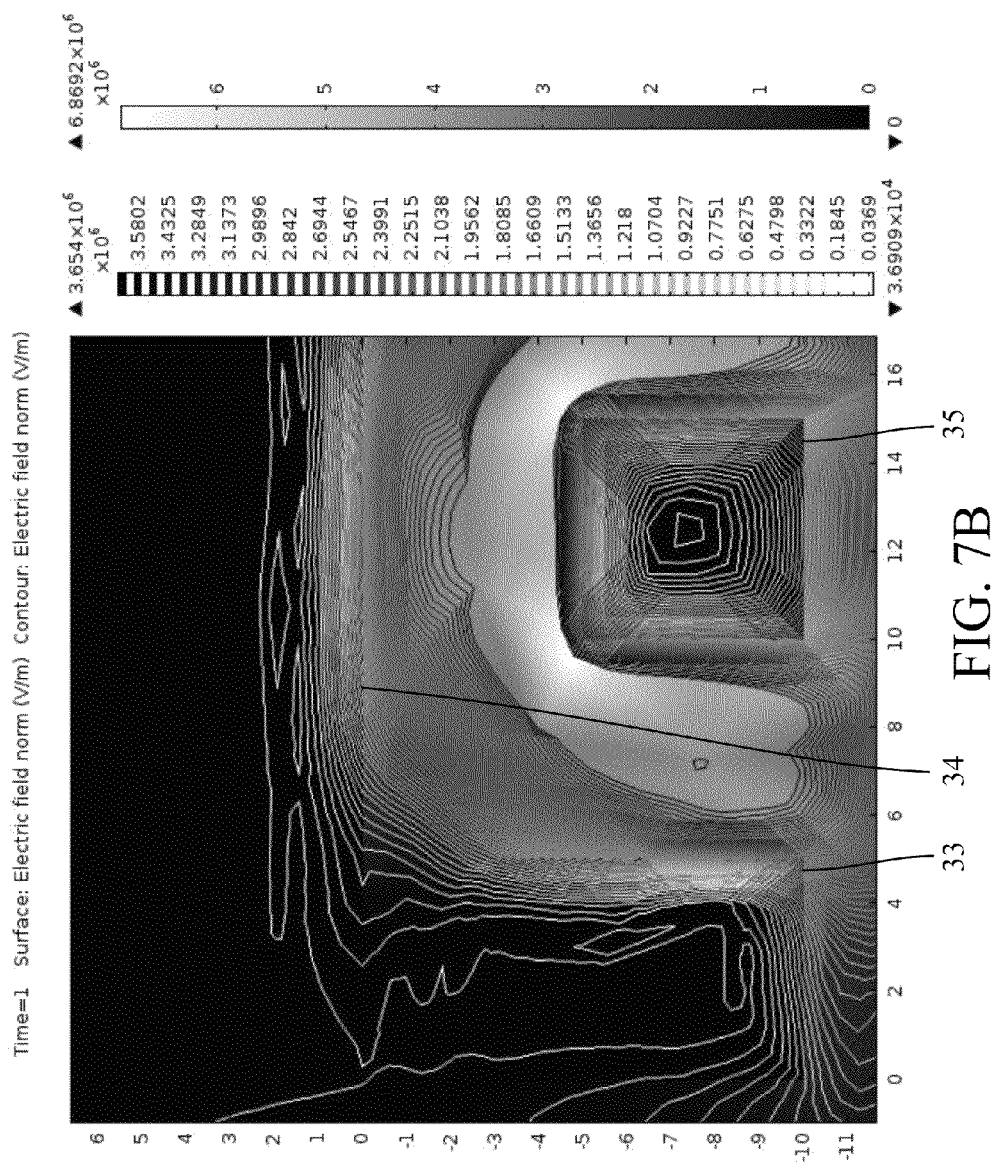
Figure 7C:
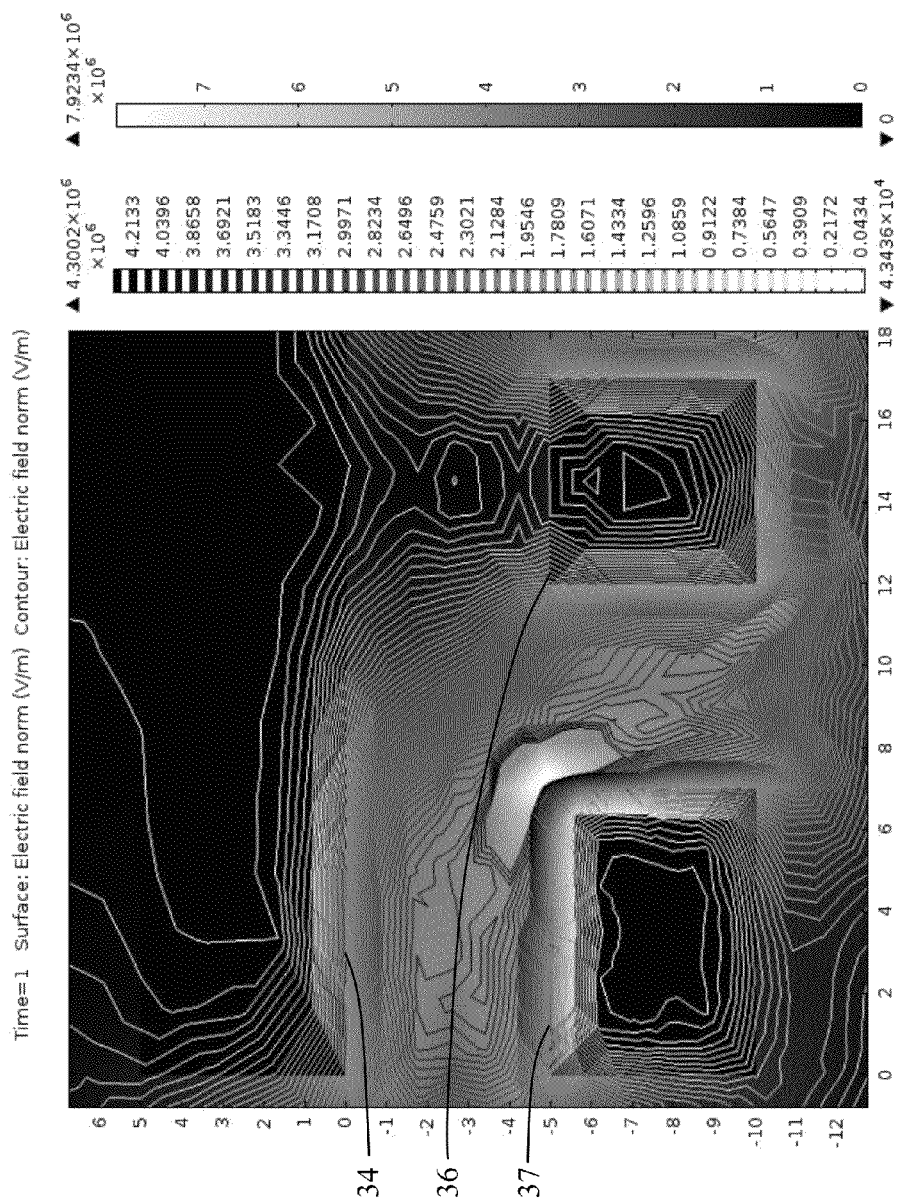
Figure 7D:
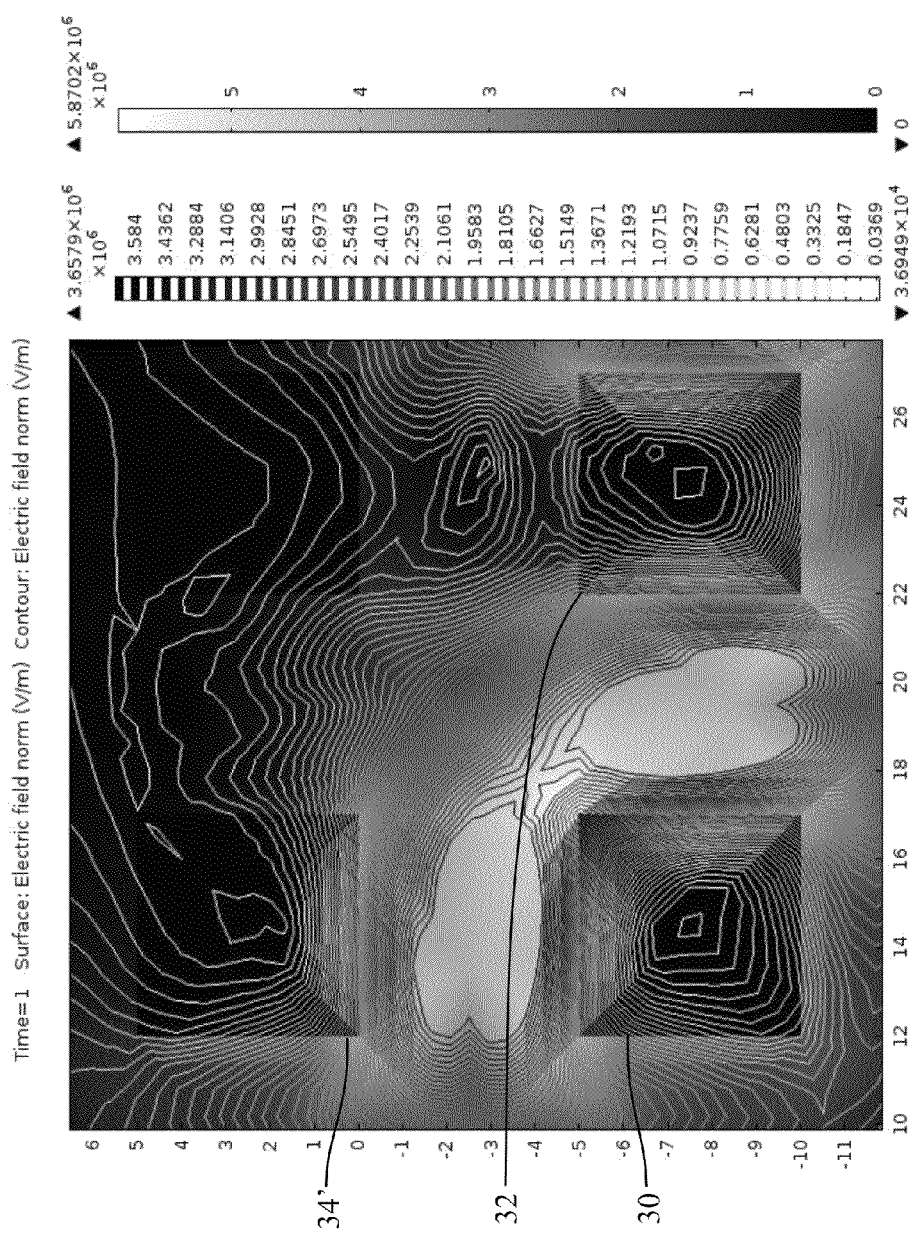
Figure 7E:
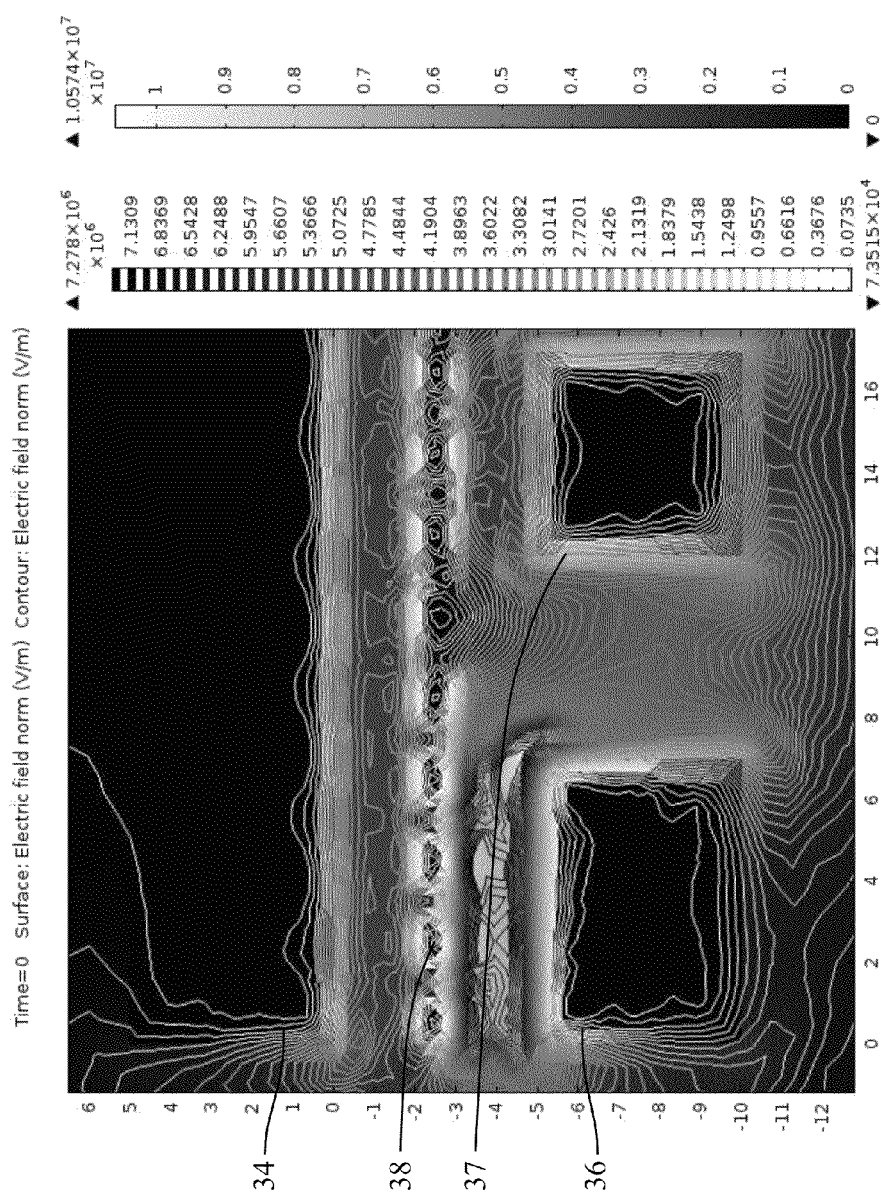

As shown in FIG. 7A, when the first electrode 30 (the box at the right-bottom corner) and the third electrode 34 (the box in the upper middle) are supplied with the same potential, the electric field either above or right to the second electrode 32 (the box at left bottom corner) may have higher electrical intensity. That means the collection of the electric charges may be better and more efficient. Similarly, the collections of the electric charges in FIG. 7B-7E may be also better and more efficient in comparison with that of the traditional sensing elements. The disclosure is capable to more efficiently collect both vertical and horizontal electric fields, which will be discussed in the followings.

The above-mentioned embodiments illustrate some different combination of the sensing element in order to explain the principles of the disclosure. The disclosure is not limited to the embodiments disclosed above. Alternative embodiments will become apparent to those skilled in the art to which the present disclosure pertains without departing from its spirit and scope. For example, the plurality of the first portions 30a, 30b, 32a, 32b of the first and second electrodes 30, 32 in the fourth embodiment can be replaced with the plurality of the first portions 33a, 33b, 35a, 35b of the first and second electrodes 33, 35 with different height in the second embodiment. Likewise, other replacement of similar elements in different embodiments may be considered for application purposes. Accordingly, the scope of the present disclosure is defined by the appended claims rather than the foregoing description and the exemplary embodiments described therein.

Please refer to FIG. 8 which illustrates a function block diagram of an electrical radiography imaging system according to one embodiment. As shown in FIG. 8, the electrical radiography imaging system may include a sensing element 12, a control module 80, a receiving module 82, a driving module 84, and a high voltage module 86.

Please referring to FIGS. 1A and 1B as well, the sensing element 12 may include a plurality of pixels arranged in an array. Each of the pixels may include a substrate 10, an active component 20, a first electrode 30, a second electrode 32, a third electrode 34, a first blocking layer 40, and a photo-conversion layer 50. The first electrode 30 may include a plurality of first portions 30a, 30b of the first electrode 30. The second electrode 32 may include a plurality of first portions 32a, 32b of the second electrode 32. The structure of the sensing element 12 in FIG. 8 is similar to the first embodiment in FIGS. 1A and 1B. Although the radiography imaging system in FIG. 8 utilizes the sensing element 12 similar to the first embodiment in FIGS. 1A and 1B, the radiography imaging system is not restrict to the first embodiment of the sensing element. The second to fifth embodiments or other alternative embodiments may be applied in the radiography imaging system.

The substrate 10 of each pixel may be the same substrate (integrated into one substrate), but different region. In other words, one single substrate may be divided into a plurality of pixels arrange in an array. Each sensing portion (sensing element) in one single pixel may include an active component 20.

The high voltage module 86 may generate a plurality of high voltage signals and be electrically connected with the first electrodes 30 and the third electrodes 34, respectively. The moving direction of the electric charges between the first and the second electrodes 30, 32 may be horizontal and abbreviated as VH. The moving direction of the electric charges between the third and second electrodes 34, 32 may be vertical and called abbreviated as VV.

The driving module 84 may drive the active components 20. The receiving module 82 may be electrically connected with the active components 20. Each of the active components 20 may include a capacitor 70. The receiving module 82 may be electrically connected with the capacitor 70 to receive the electric charges stored in the capacitor 70.

The control module 80 may control the driving module 84 to progressively scan and to time-sharing (or called as time division) drive the active components 20. The progressively scan may be but not limited to line by line scan or interlaced scan. The control module 80 may control the high voltage module 86 to respectively deliver the high voltage signals to the first and the third electrodes 30, 34 of the driven active component 20 and to make the voltage of the first electrode 30 fall between the voltage of the second electrode 32 and the voltage of the third electrode 34. The control module 80 may control the receiving module 82 to receive electric charges from the driven active component 20 and output an electrical signal corresponding to the received electric charges.

When the electromagnetic wave 74 (taking x-ray as an example in the following description) enters the photo-conversion layer 50, the photo-conversion layer 50 may convert the x-ray 74 into electrons and electron holes. The first and third electrodes 30, 34 of the driven sensing element 12 may be, respectively, supplied with high voltage signals. The second electrode 32 may be connected with the capacitor so that the potentials of the second electrode 32 and the capacitor may be the same (common). Accordingly, the electrons and electron holes generated in the photo-conversion layer 50 may be attracted by the first, second and third electrodes 30, 32, 34, form electric charges at the second electrode 32, and then stored in the capacitor 70 connected with the second electrode 32.

The control module 80 may control the driving module 84 to progressively scan and to time-sharing (or called as time division) drive the active components 20. In a progress scan mechanism, there is only one pixel driven at time. Specifically, when the control module 80 selects one pixel to be driven, the first and the third electrodes 30, 34 of sensing element 12 corresponding to the selected pixel may be time-sharing supplied with the high voltage signals. For example, if the total period of time for which the pixel is driven by the high voltage module 86 is 10 mini-seconds (ms), the period of time for which the first electrode 30 is driven is, but not limited to, 8 ms and the period of time for which the third electrode 34 is driven is, but not limited to, 2 ms. Alternatively, In the above example, the time periods for the first and third electrodes 30, 34 is, but not limited to 0 ms and 10 ms, or 10 ms and 0 ms, which may be adjusted in accordance with the demands, or applications. In other words, the control module 80 may control the period of time that the high voltage module 86 delivers the high voltage signal to the first electrode 30 of the driven active component 20 to be substantially different from the period of time that the high voltage module 86 delivers the high voltage signal to the third electrode 34 of the driven active component 20.

The potential of the first electrode 30 may be between the potential of the second electrode 32 and the potential of the third electrode 34. For example, the potential of the first electrode 30 is, but not limited to, −5 V, the potential of the second electrode 32 is, but not limited to, 0 V (grounded), and the potential of the third electrode 34 is, but not limited to, −20 V. The potentials of the first, second, and third electrode 30, 32, 34 may be adjusted in accordance with the structure or parameters of the sensing elements 12.

The control module 80 may control the receiving module 82 to receive the electric charges from the driven active component 20 and may output electrical signals corresponding to the received electric charges. Specifically, the control module 80 may transfer the received electric charges into an electrical signals corresponding to the intensity of the received electric charges. The output electrical signals may represent different intensities of the electric charges.

The ratio of time-sharing (time-division) above-mentioned may correspond to the application of the sensing element 12. As shown in FIG. 8, the field between the first electrode 30 and the second electrode 32 may be horizontal electric field and the field between the third electrode 34 and the second electrode 32 may be vertical electric field. When there are more electric charges in the horizontal electric field than that in the vertical electric field, the period of time for which the high voltage module 86 delivers high voltage signal to the first electrode 30 may be longer than the period of time for which the high voltage module 86 delivers high voltage signal to the third electrode 34. For example, the ratio of the first electrode 30 to third electrode 34 is, but not limited to, 4:1. In contrast, if the electrical charges in the horizontal electric field is less that that in the vertical electric field, the period of time for which the high voltage module 86 delivers high voltage signal to the first electrode 30 may be shorter than the period of time for which the high voltage module 86 delivers high voltage signal to the third electrode 34. For example, the ratio of the first electrode 30 to third electrode 34 is 1:4. Consequently, the collection efficiency of electrical charges may be increased.

Furthermore, the ratio of time-division may differ in accordance with the section the pixel is located. For example, the ratio of time-division for the pixels at a first section is 1:5 and the ratio of time-division for the pixels at a second section is 5:1. The ratio may be decided in accordance with the applications of the sensing element 12.

Figure 9:
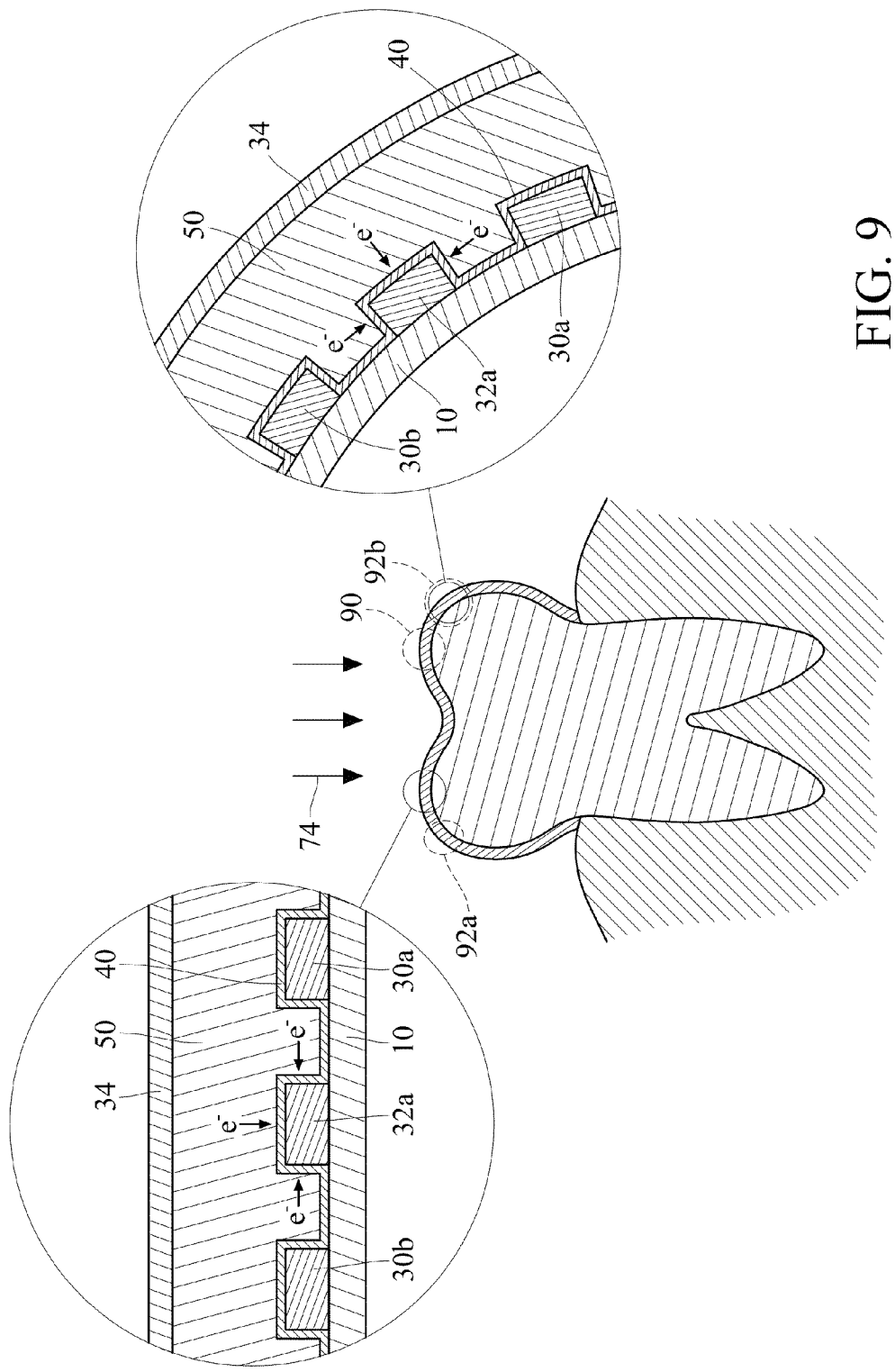
FIG. 9 illustrates a cross-sectional view of the sensing element for electromagnetic wave detection according to the first embodiment applied in a tooth.

Please refer to FIG. 9 which illustrates a cross-sectional view of the sensing element for electromagnetic wave detection according to the first embodiment applied in a tooth. The tooth is wrapped with sensing element 12. As shown in FIG. 9, the x-ray 74 may enter the sensing element 12 from the top of the figure. Accordingly, there may be more electric charges generated in the horizontal electric field of the flat section 90 of the sensing element 12 covering the flat section 90 of the tooth than that in the vertical electric field of the flat section 90 of the sensing element 12. Similarly, there may be more electric charges generated in the vertical electric field of the curved section 92a, 92b of the sensing element 12 covering the curved section 92a, 92b of the tooth than that in the horizontal electric field of the curved section 92a, 92b of the sensing element 12. Therefore, the control module 80 may control the high voltage module 86 to deliver the high voltage signal to the third electrodes 34 of the active components 20 (vertical electric field) located in the flat section 90 longer than that to the first electrodes 30 of the active components 20 (horizontal electric field) located in the flat section 90. Similarly, the control module 80 may control the high voltage module 86 to deliver the high voltage signal to the first electrodes 30 of the active components 20 located in the curved section 92a, 92b of the sensing element 12 longer than that to the third electrodes 34 of the active components 20 located in the curved section 92a, 92b of the sensing element 12. Consequently, the collection efficiency of the electrical charges may be raised and the signal-noise ratio may be reduced.

The electrical radiography imaging system may further include a display device 88 for receiving the electrical signal from the control module 80 and display the electrical signal by progressive scan. The display device 88 may be, but not limited to, a liquid crystal display. The electrical signal output by the high voltage module 86 may be not only displayed by the display device 88, but also stored in any memory like hard disk drive or flash memory.

Figure 10:
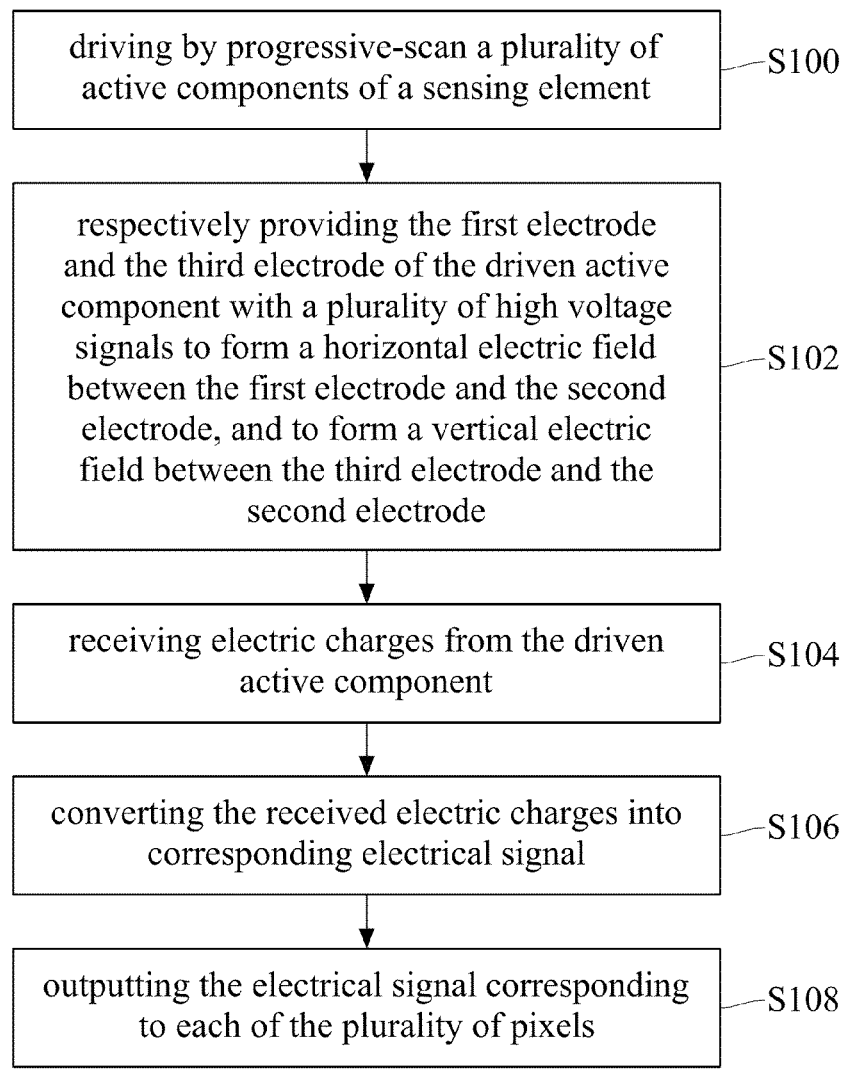
FIG. 10 illustrates a flow chart for a radiography imaging method according to one embodiment.

Please refer to FIG. 10 which illustrates a flow chart for a radiography imaging method according to one embodiment.

The radiography imaging method may include the following steps.

Step S100: driving a plurality of active components of a sensing element scanningly (i.e. by progressive-scan), the sensing element comprising a plurality of pixels, each of the plurality of pixels comprising one of the plurality of active components, a photo-conversion layer, a first electrode, a second electrode, and a third electrode, the photo-conversion layer disposed among the first electrode, the second electrode, and the third electrode;

Step S102: respectively providing the first electrode and the third electrode of the driven active component with a plurality of high voltage signals to form a horizontal electric field between the first electrode and the second electrode, and to form a vertical electric field between the third electrode and the second electrode;

Step S104: receiving electric charges from the driven active component;

Step S106: converting the received electric charges into corresponding electrical signal; and Step S108: outputting the electrical signal corresponding to each of the plurality of pixels.

The sensing element of S100 may be any sensing element disclosed in the first to fifth embodiments. The sensing element 12 in the first embodiment may include a plurality of pixels. Each pixel may include an active component 20, a photo-conversion layer 50, a first electrode 30, a second electrode 32, and a third electrode 34. The photo-conversion layer 50 may be located among the first electrode 30, the second electrode 32, and the third electrode 34.

The progressive scan in S100 means line by line scan. Taking active components 20 arranged in a two dimension array as an example, the control module 80 may control the high voltage module 86 to firstly deliver high voltage signal to the active component 20 located at the first row and the first column, and then secondly deliver high voltage signal to the active component 20 located at the first row and the second column, and so on until to lastly deliver high voltage signal to the active component 20 located at the last row and last column.

The step of "respectively providing the first electrode and the third electrode of the driven active component with a plurality of high voltage signals to form a horizontal electric field between the first electrode and the second electrode, and to form a vertical electric field between the third electrode and the second electrode" may be time-division (time-sharing) providing with the high voltage signals. Specifically, the period of time the first electrode 30 of the driven active component 20 is provided with the high voltage signal may be different from the period of time the third electrode 34 of the driven active component 20 is provided with the high voltage signal. For example, the first electrode 30 shares all of the time the control module 80 allocates to the driven active component.

Regarding the steps S104 and S106, the driven active component 20 may correspond to the pixel the high voltage module 86 is driving at that period of time. Therefore, the converted electrical signal may represent the intensity of the electric charges of the pixel. After the control module 80 has received and output all electrical signals corresponding to all pixels arranged in a 2-D array, the display device 88 may display an electrical radiography image corresponding to the sensing element 12. The control module 80 may time-sharing output the electrical signals or output all the electrical signals after having received all the electrical signals.

Figure 11A:
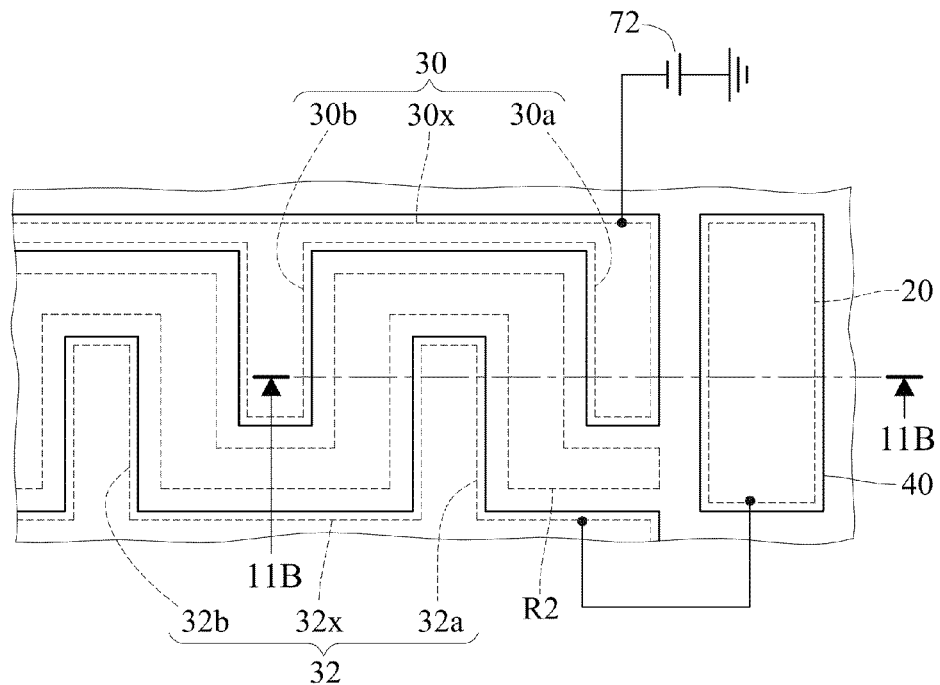
FIG. 11A illustrates a portion of the top view of a sensing element for electromagnetic wave detection in an electrical radiography imaging system according to the sixth embodiment.
Figure 11B:
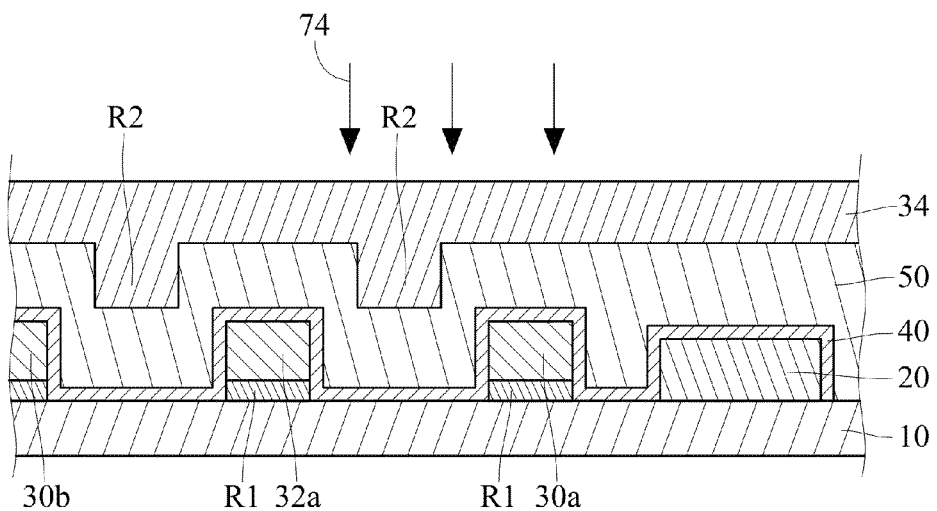
FIG. 11B illustrates the cross-sectional view at the position 11B-11B of the FIG. 11A.
Figure 11C:
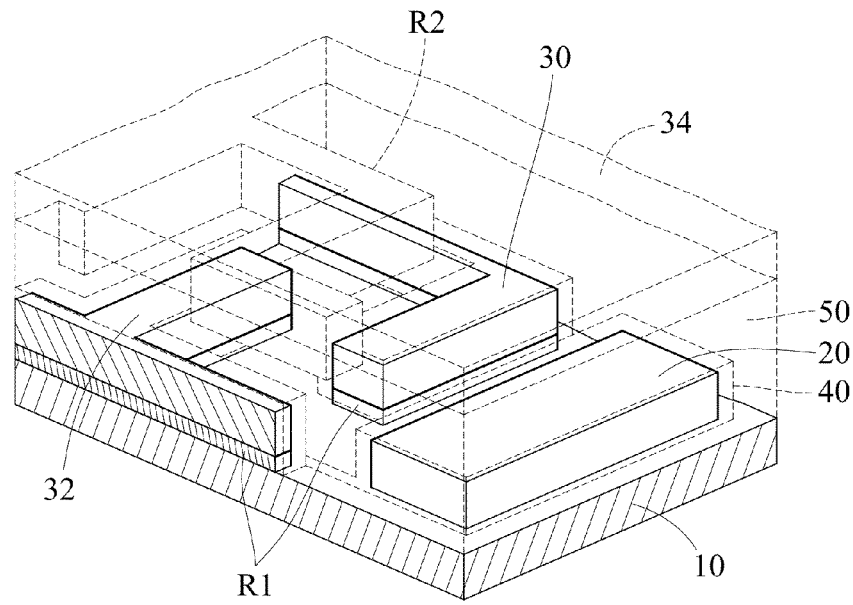
FIG. 11C illustrates a perspective view of the sensing element in the FIG. 11A.

Please refer to FIGS. 11A to 11C. FIG. 11A illustrates a portion of the top view of a sensing element for electromagnetic wave detection in an electrical radiography imaging system according to the sixth embodiment. FIG. 11B illustrates the cross-sectional view at the position 11B-11B of the FIG. 11A. FIG. 11C illustrates a perspective view of the sensing element in the FIG. 11A.

Different from the first embodiment in FIG. 1B, each of pixels of the sensing element in FIG. 11B may further include a plurality of first ribs R1 and the third electrode 34 may have a plurality of second ribs R2. In practice, the first ribs R1 may cover on the substrate 10, and the first portions 30a and 30b of the first electrode 30 and the first portions 32a and 32b of the second electrode 32 may cover on the first ribs R1 respectively. The locations of the first portions 30a and 30b of the first electrode 30 and the locations of the first portions 32a and 32b of the second electrode 32 may correspond to the locations of the second ribs R2. Each of the second ribs R2 may be between one of the first portions 30a and 30b of the first electrode 30 and adjacent one of the first portions 32a and 32b of the second electrode 32. For example, the height of the first rib R1 is in a range from 5 to 40 um, and the height of the second rib R2 is in a range from 5 to 40 um. Since the cross-sectional view of the first portion 32b of the second electrode 32 is the same as that of the first portion 32a of the second electrode 32, it can be referred to the cross-sectional view of the first portion 32a of the second electrode 32 and is not shown in FIGS. 11 B and 11C.

On the other hand, the arrangement, material and shapes of the other components of the sensing element in this embodiment can be referred to the above first embodiment and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 12:
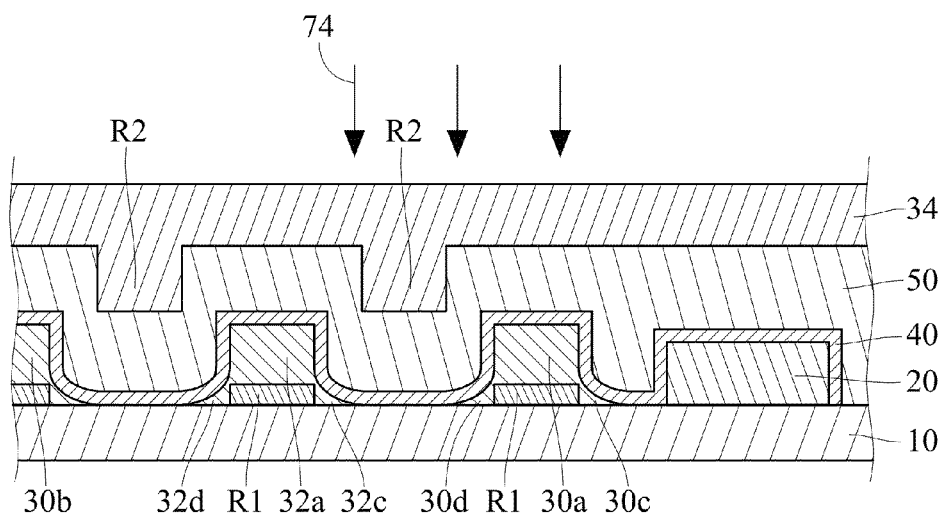
FIG. 12 illustrates the cross-sectional view of a sensing element for electromagnetic wave detection in an electrical radiography imaging system according to the seventh embodiment.

FIG. 12 illustrates the cross-sectional view of a sensing element for electromagnetic wave detection in an electrical radiography imaging system according to the seventh embodiment. The sensing element in FIG. 12 may be similar to the sensing element in FIG. 11B. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 12. Compared with the sensing element in FIG. 11B, each of the first portions 30a and 30b of the first electrode 30 in FIG. 12 may have two extended portions 30c and 30d at its two opposite sides respectively, and each of the first portions 32a and 32b of the second electrode 32 in FIG. 12 may have two extended portions 32c and 32d at its two opposite sides respectively. Each of the extended portions may cover on at least one of the substrate 10 and the corresponding first rib R1.

The arrangement, material and shapes of the other components of the sensing element in this embodiment can be referred to the above sixth embodiment and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 13:
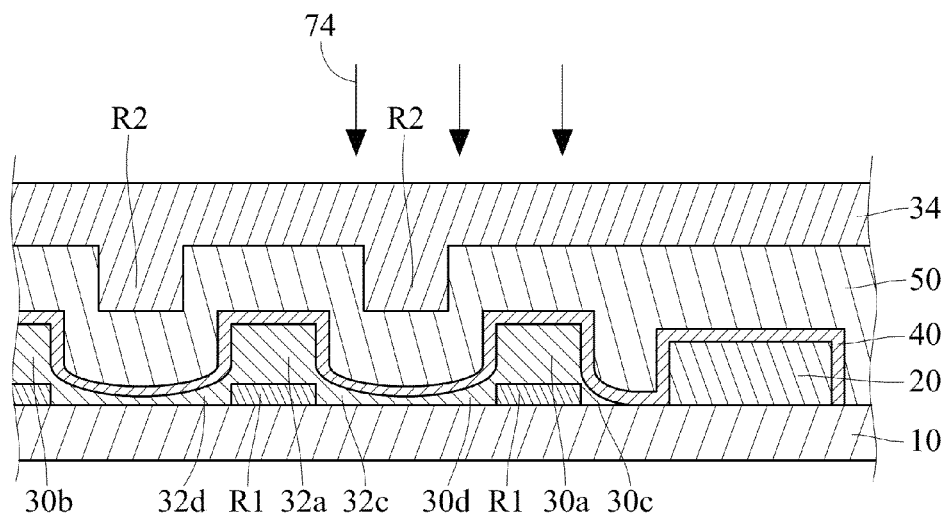
FIG. 13 illustrates the cross-sectional view of a sensing element for electromagnetic wave detection in an electrical radiography imaging system according to the eighth embodiment.

FIG. 13 illustrates the cross-sectional view of a sensing element for electromagnetic wave detection in an electrical radiography imaging system according to the eighth embodiment. The sensing element in FIG. 13 may be similar to the sensing element in FIG. 12. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 13. However, in FIG. 13, one of the extended portions of the first portion of the first electrode 30 may be connected to one of the extended portions of the first portion of the second electrode 32 adjacent to the first portion of the first electrode 30. For example, the extended portion 30d of the first portion 30a of the first electrode 30 is connected to the extended portion 32c of the first portion 32a of the second electrode 32.

The arrangement, material and shapes of the other components of the sensing element in this embodiment can be referred to the above seventh embodiment and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 14:
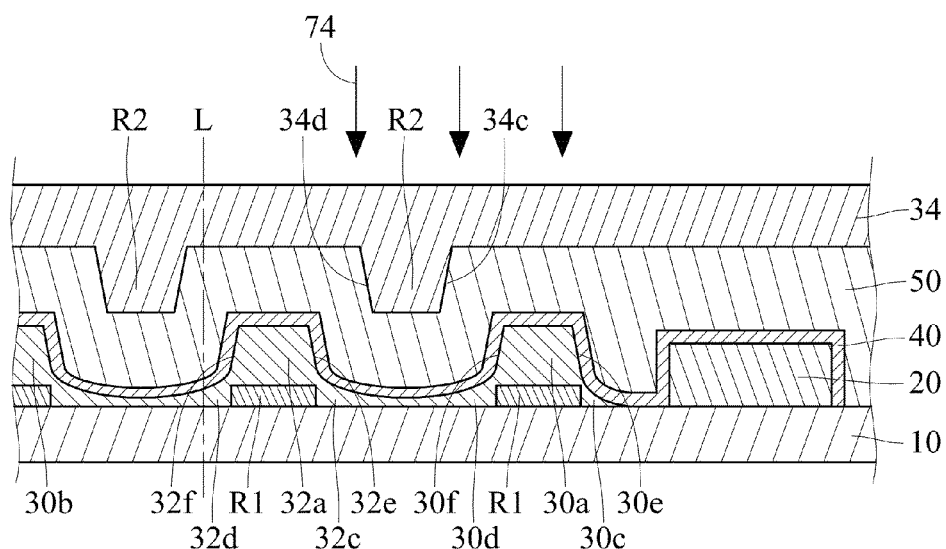
FIG. 14 illustrates the cross-sectional view of a sensing element for electromagnetic wave detection in an electrical radiography imaging system according to the ninth embodiment.

FIG. 14 illustrates the cross-sectional view of a sensing element for electromagnetic wave detection in an electrical radiography imaging system according to the ninth embodiment. The sensing element in FIG. 14 may be similar to the sensing element in FIG. 13. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 14. In FIG. 14, each of two opposite side surfaces 30e and 30f of each first portion of the first electrode 30 may have an acute angle with a normal line L of the substrate 10, but is not limited thereto. Each of two opposite side surfaces 32e and 32f of each first portion of the first electrode 32 may have an acute angle with the normal line L of the substrate 10, but is not limited thereto. Each of two opposite side surfaces 34a and 34b of the second rib R2 may have an acute angle with the normal line L of the substrate 10, but is not limited thereto. That is, the profile of each first portion of the first electrode 30 and the second electrode 32 and the profile of each second rib R2 may be trapezoid.

The arrangement, material and shapes of the other components of the sensing element in this embodiment can be referred to the above eighth embodiment and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 15:
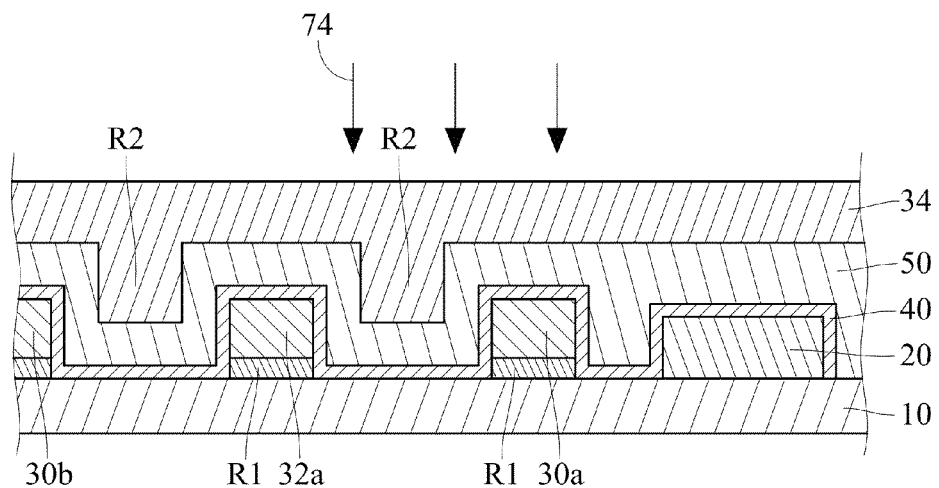
FIG. 15 illustrates the cross-sectional view of a sensing element for electromagnetic wave detection in an electrical radiography imaging system according to the tenth embodiment.

FIG. 15 illustrates the cross-sectional view of a sensing element for electromagnetic wave detection in an electrical radiography imaging system according to the tenth embodiment. The sensing element in FIG. 15 may be similar to the sensing element in FIG. 11B. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 15. In FIG. 15, each of the second ribs R2 may not only be between one of the first portions 30a and 30b of the first electrode 30 and adjacent one of the first portions 32a and 32b of the second electrode 32 but also overlap them. For example, the second rib R2 is between and overlaps the first portion 30a of the first electrode 30 and the first portion 32a of the second electrode 32.

The arrangement, material and shapes of the other components of the sensing element in this embodiment can be referred to the above sixth embodiment and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 16:
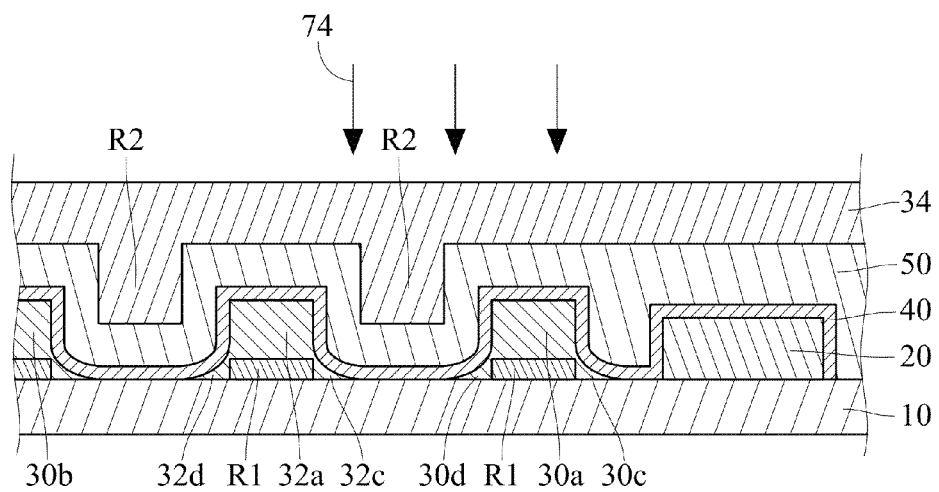
FIG. 16 illustrates the cross-sectional view of a sensing element for electromagnetic wave detection in an electrical radiography imaging system according to the eleventh embodiment.

FIG. 16 illustrates the cross-sectional view of a sensing element for electromagnetic wave detection in an electrical radiography imaging system according to the eleventh embodiment. The sensing element in FIG. 16 may be similar to the sensing element in FIG. 12. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 16. Each of the second ribs R2 in FIG. 16 may be between and overlap one of the first portions 30a and 30b of the first electrode 30 and adjacent one of the first portions 32a and 32b of the second electrode 32.

The arrangement, material and shapes of the other components of the sensing element in this embodiment can be referred to the above embodiment in FIG. 12 and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 17:
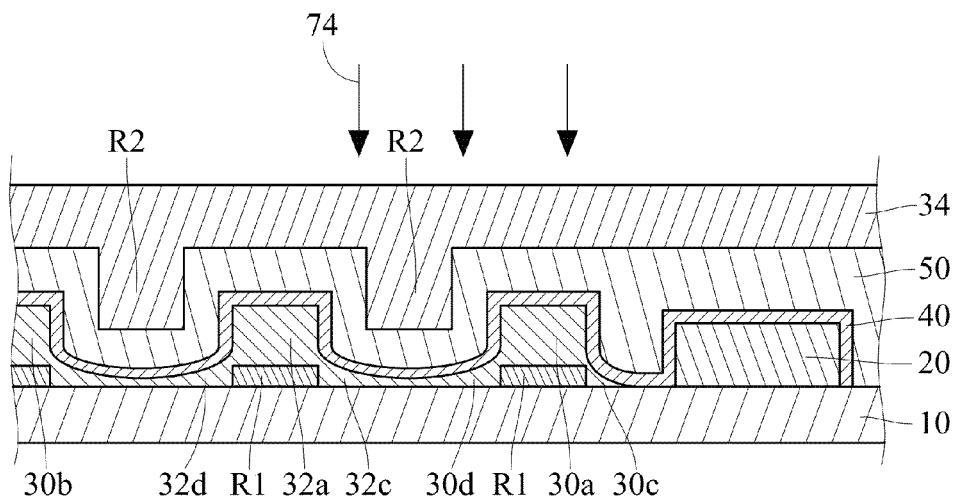
FIG. 17 illustrates the cross-sectional view of a sensing element for electromagnetic wave detection in an electrical radiography imaging system according to the twelfth embodiment.

FIG. 17 illustrates the cross-sectional view of a sensing element for electromagnetic wave detection in an electrical radiography imaging system according to the twelfth embodiment. The sensing element in FIG. 17 may be similar to the sensing element in FIG. 13. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 17. Each of the second ribs R2 in FIG. 17 may be between and overlap one of the first portions 30a and 30b of the first electrode 30 and adjacent one of the first portions 32a and 32b of the second electrode 32.

The arrangement, material and shapes of the other components of the sensing element in this embodiment can be referred to the above embodiment in FIG. 13 and thus, will not be repeated hereinafter. In addition, the application of the sensing element in this embodiment can be referred to the above one or more embodiments illustrated in FIGS. 8, 9 and/or 10 and thus, will not be repeated hereinafter.

Figure 18:
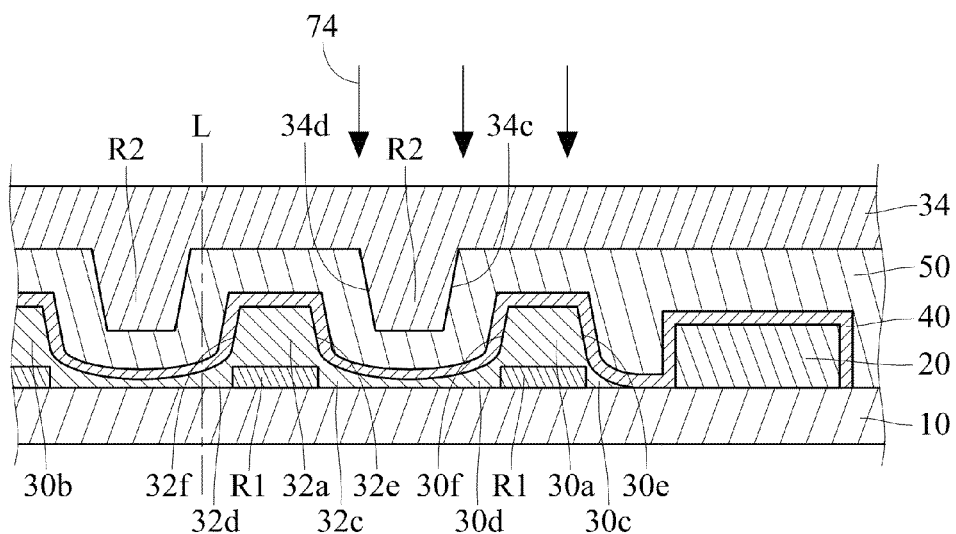
FIG. 18 illustrates the cross-sectional view of a sensing element for electromagnetic wave detection in an electrical radiography imaging system according to the thirteenth embodiment.

FIG. 18 illustrates the cross-sectional view of a sensing element for electromagnetic wave detection in an electrical radiography imaging system according to the thirteenth embodiment. The sensing element in FIG. 18 may be similar to the sensing element in FIG. 14. Since the cross-sectional view of the first portion 32b of the second electrode 32 is the same as that of the first portion 32a of the second electrode 32, it can be referred to the cross-sectional view of the first portion 32a of the second electrode 32 and is not shown in FIG. 18. Each of the second ribs R2 in FIG. 18 may be between and overlap one of the first portions 30a and 30b of the first electrode 30 and adjacent one of the first portions 32a and 32b of the second electrode 32.

The arrangement, material and shapes of the other components of the sensing element in this embodiment can be referred to the above embodiment in FIG. 14 and thus, will not be repeated hereinafter. In addition, the application of the sensing element in this embodiment can be referred to the above one or more embodiments illustrated in FIGS. 8, 9 and/or 10 and thus, will not be repeated hereinafter.

In view of the above sixth to thirteenth embodiments, the sensing element in these embodiments are based on the first embodiment in FIG. 1B, and however, the sixth to thirteenth embodiments can add other one or more features by referring the embodiments illustrated in FIGS. 2 to 4.

The above-mentioned embodiments illustrate some different combination of the sensing element in order to explain the principles of the disclosure. The disclosure is not limited to the embodiments disclosed above. Alternative embodiments will become apparent to those skilled in the art to which the present disclosure pertains without departing from its spirit and scope.

What is claimed is:

1. An electrical radiography imaging system, comprising:
 a sensing element, comprising a plurality of pixels arranged in an array, each of the pixels comprising:
 a substrate;
 an active component on the substrate;
 a first electrode on the substrate, the first electrode having a plurality of first portions;
 a second electrode on the substrate, the second electrode having a plurality of first portions and electrically coupled with the active component, the first portions of the first electrode being interlaced with the first portions of the second electrode;
 a photo-conversion layer on the second electrode; and
 a third electrode on the photo-conversion layer.

2. The electrical radiography imaging system according to claim 1, wherein the second electrode and the first electrode form a horizontal electric field, and the second electrode and the third electrode form a vertical electric field when the sensing element is supplied with electrical power.

3. The electrical radiography imaging system according to claim 2, further comprising a photoexcitation layer on the third electrode.

4. The electrical radiography imaging system according to claim 1, wherein a height of the second electrode is substantially taller than a height of the first electrode.

5. The electrical radiography imaging system according to claim 1, wherein widths of the first portions of the second electrode are substantially wider than widths of the first portions of the first electrode.

6. The electrical radiography imaging system according to claim 1, further comprising a plurality of fourth electrodes embedded within the photo-conversion layer, wherein the plurality of fourth electrodes is not electrically coupled with the first electrode, the second electrode, or the third electrode.

7. The electrical radiography imaging system according to claim 1, wherein the third electrode comprises a plurality of sub-electrodes, each of the first portions of the first electrode corresponds to one of the sub-electrodes, and each of the first portions of the second electrode corresponds to one of the sub-electrodes.

8. The electrical radiography imaging system according to claim 1, wherein each of the pixels further comprises:
 a plurality of first ribs on the substrate,
 wherein the third electrode has a plurality of second ribs, the first electrode and the second electrode are on the first ribs, and locations of the first portions of the first electrode and locations of the first portions of the second electrode correspond to locations of the second ribs.

9. The electrical radiography imaging system according to claim 8, wherein each of the second ribs is between one of the first portions of the first electrode and one of the first portions of the second electrode.

10. The electrical radiography imaging system according to claim 9, wherein the first portion of the first electrode has two extended portions that are at two opposite sides of the first portion of the first electrode respectively and are on at least one of the substrate and one of the first ribs, and the first portion of the second electrode has two extended portions that are at two opposite sides of the first portion of the second electrode respectively and are on at least one of the substrate and other one of the first ribs.

11. The electrical radiography imaging system according to claim 10, wherein one of the extended portions of the first portion of the first electrode is connected to one of the extended portions of the first portion of the second electrode adjacent to the first portion of the first electrode.

12. The electrical radiography imaging system according to claim 9, wherein each of the second ribs overlaps one of the first portions of the first electrode and one of the first portions of the second electrode.

13. The electrical radiography imaging system according to claim 8, wherein the second rib has two opposite side surfaces each having an acute angle with a normal line of the substrate.

14. The electrical radiography imaging system according to claim 1, wherein the first portion of the first electrode has two opposite side surfaces each having an acute angle with a normal line of the substrate, the first portion of the second electrode has two opposite side surface each having an acute angle with the normal line of the substrate.

15. The electrical radiography imaging system according to claim 1, wherein the first electrode and the second electrode are interdigitated electrodes.

16. The electrical radiography imaging system according to claim 1, further comprising:
 a high voltage module electrically connected with the first electrodes and the third electrodes and configured to generate a high voltage signal;
 a driving module electrically connected to the active components;
 a receiving module electrically connected to the active components; and
 a control module, configured to control the driving module to scanningly drive the active components, the control module controlling the high voltage module to respectively deliver the high voltage signal to the first and the third electrodes and making a first voltage on the first electrode fall between a second voltage on the second electrode and a third voltage on the third electrode, and the control module controlling the receiving module to receive electric charges from the driven active component and outputting an electrical signal corresponding to the received electric charges.

17. The electrical radiography imaging system according to claim 16, further comprising a display device receiving the electrical signal and display the electrical signal by progressive scan.

18. The electrical radiography imaging system according to claim 1, wherein each of the pixels comprising:
 a first blocking layer on the active component, the first electrode, and the second electrode; and
 an insulating layer sandwiched between the active component and the first blocking layer,
 wherein the photo-conversion layer is on the first blocking layer.

19. A radiography imaging method, comprising:
 driving in a progressive scan way a plurality of active components of a sensing element, the sensing element comprising a plurality of pixels, each of the plurality of pixels comprising one of the plurality of active components, a photo-conversion layer, a first electrode, a second electrode, and a third electrode, the photo-conversion layer disposed among the first electrode, the second electrode, and the third electrode;
 respectively providing the first electrode and the third electrode of the driven active component with a plurality of high voltage signals to form a horizontal electric field between the first electrode and the second electrode, and to form a vertical electric field between the third electrode and the second electrode;
 receiving electric charges from the driven active component;
 converting the received electric charges into corresponding electrical signal; and
 outputting the electrical signal corresponding to each of the plurality of pixels.

20. A radiography imaging method, comprising:
 driving in a progressive scan way a plurality of active components of a sensing element, the sensing element comprising a plurality of pixels, each of the plurality of pixels comprising an active components, a photo-conversion layer, a first electrode set, a plurality of first ribs, and a second electrode set;
 respectively providing the first electrode set and the second electrode set with a high voltage signal to form a horizontal electric field and a vertical electric field between the first electrode set and the second electrode set;
 receiving electric charges from the driven active component;
 converting the received electric charges into corresponding electrical signal; and
 outputting the electrical signal corresponding to each of the plurality of pixels,
 wherein a plurality of first portions of the first electrode set is on the first ribs, the photo-conversion layer is between the first electrode set and the second electrode set, and the second electrode set has a plurality of second ribs corresponding to the first portions of the first electrode set.

* * * * *